(12) United States Patent
Herre et al.

(10) Patent No.: US 7,549,449 B2
(45) Date of Patent: Jun. 23, 2009

(54) PAINT DELIVERY AND APPLICATION SYSTEM AND METHOD

(75) Inventors: Frank Herre, Oberriexingen (DE);
Rainer Melcher, Oberstenfeldt (DE);
Herbert Martin, Weinstadt (DE);
Michael Baumann, Flein (DE);
Manfred Michelfelder, Steinheim (DE);
Richard M. Ostin, Farmington, MI (US); Robert F. Heldt, Oxford, MI (US); Joachim Hering, Duermentingen (DE); Hans Jurgen Nolte, Stuttgart (DE)

(73) Assignee: Durr Systems, Inc., Plymouth, MI (US)

( * ) Notice: Subject to any disclaimer, the term of this patent is extended or adjusted under 35 U.S.C. 154(b) by 614 days.

(21) Appl. No.: 10/511,045

(22) PCT Filed: May 6, 2003

(86) PCT No.: PCT/US03/14471

§ 371 (c)(1),
(2), (4) Date: Apr. 26, 2005

(87) PCT Pub. No.: WO03/095106

PCT Pub. Date: Nov. 20, 2003

(65) Prior Publication Data

US 2005/0173018 A1   Aug. 11, 2005

(51) Int. Cl.
*B65B 1/04*   (2006.01)
*B05D 1/02*   (2006.01)
*B05B 15/02*  (2006.01)

(52) U.S. Cl. .............................. 141/91; 141/67; 141/89; 141/98; 141/104; 427/421.1; 239/114

(58) Field of Classification Search ...................... 141/2, 141/9, 18, 21, 27, 67, 89, 94, 95, 98, 100, 141/104, 192, 198, 91; 427/421.1, 427; 118/300; 239/106, 114
See application file for complete search history.

(56) References Cited

U.S. PATENT DOCUMENTS 3,108,012 A    10/1963   Curtis (Continued)

FOREIGN PATENT DOCUMENTS

DE    19830029    1/2000

(Continued)

OTHER PUBLICATIONS

PCT/US05/00605 International Search Report.

(Continued)

*Primary Examiner*—Timothy L Maust

(57) ABSTRACT

A paint delivery and application system including a color changer, at least two paint canisters and a paint applicator, a first pair of supply lines connected between the color changer and the paint canisters and a second pair of supply lines connecting the paint canisters and the paint applicator, wherein the paint canisters operate in tandem permitting delivery of a first paint to one of the paint canisters while a second paint canister is electrically isolated from the color changer and is delivering paint to the applicator. In one disclosed embodiment, the delivery line from the paint canisters to the applicator includes two pigs and solvent is delivered between the pigs, such that this system is self purging.

27 Claims, 24 Drawing Sheets

U.S. PATENT DOCUMENTS

| | | | |
|---|---|---|---|
| 4,390,126 | A | 6/1983 | Buchholz et al. |
| 6,582,774 | B2 | 6/2003 | Klein et al. |
| 6,589,348 | B2 | 7/2003 | Ott |
| 7,066,186 | B2 * | 6/2006 | Bahr .................. 134/56 R |
| 2006/0019036 | A1 * | 1/2006 | Herre et al. .......... 427/421.1 |

FOREIGN PATENT DOCUMENTS

| | | | |
|---|---|---|---|
| DE | 1172152 | * | 1/2002 |
| DE | 19937426 | | 5/2003 |
| EP | 1 172 153 B1 | | 8/2003 |
| WO | 03095106 | | 11/2003 |

OTHER PUBLICATIONS

English Translation of DE19937426 published May 15, 2003.
Supplementary European Search Report.

* cited by examiner

PAINT DELIVERY AND APPLICATION SYSTEM AND METHOD

FIELD OF THE INVENTION

The present invention relates to paint or coating delivery and application systems using pigging technology and methods of delivering and applying paint which significantly reduce cycle time between applications to a substrate or a plurality of substrates using multiple coating materials or colors and substantially eliminating waste of paint.

BACKGROUND OF THE INVENTION

The prior art discloses numerous paint delivery and application systems including systems using pigging technology. Such systems may be used to apply seriatim paints of different colors, for example, to a plurality of substrates, such as vehicle bodies on a moving conveyor in a paint spray booth. The term "paint," as used herein, includes solvent or water base paints used to paint or coat a substrate and generically any coating, including protective coatings, which may be applied to a substrate using an applicator, such as a sprayer or rotary atomizer. Depending on its function in the coating delivery system, pigs or pigging elements are variously referred to in the prior art as shuttles, separating elements, terminating pistons, plugs, etc. Generally, a pig or pigging element is utilized in the prior art paint delivery systems to push paint either toward the applicator to apply the paint, separate different paints or solvent, scrape or clean the paint supply lines or push paint in the supply line back to the paint supply switching device or color changer. Pigs or pigging elements have also been used to separate fluids in a delivery line including paints of different colors, solvents, etc. which may be driven through the delivery line by pneumatic pressure or other fluid.

A conventional paint supply and application system includes a source of paint under pressure, an applicator, such as a rotary atomizer, generally at high voltage, sprayer or the like, a source of solvent under pressure, and a supply line connecting the source of paint and solvent to the applicator. Where the source of paint and solvent includes a color changer or paint supply switching device, the paint supply and application system may also include a paint canister which may be mounted on a robot, for example, and the color changer is generally at ground potential. When a second paint is to be applied, the canister may be switched for a canister filled with a different paint or the canister may be connected to a source of a different paint. As used herein, the term "canister" or "paint canister" includes any container suitable for receipt and delivery of paint.

A paint delivery and application system using pigging technology for application of different paints, as disclosed in the prior art, includes a color changer or paint supply switching device, including sources of different paints and solvent under pressure, a paint applicator, a supply line connecting the color changer and the applicator and a pigging element or pig which is received in the supply line to push paint through the supply line either toward the paint applicator to apply paint to a substrate or from adjacent the paint applicator to the color changer to recover paint in the supply line. As the pigging element moves through the supply line, it pushes paint or solvent through the supply line and cleans or scrapes paint or solvent from the supply line. In one embodiment disclosed in the prior art, a pigging element is inserted into the supply line to push paint from a color changer to the applicator and the pigging element is then removed. In another embodiment disclosed in the prior art, the supply line between the paint supply switching device and the applicator includes two pig receiver stations, including a first station adjacent the paint supply switching device or color changer and a second pig station adjacent the paint applicator. The pig receiver stations are defined by a chamber which permits paint or solvent to flow around the pigging element. The pigging element is releasably retained in the first receiver station by a clamping means and then released to push paint from the first pig receiver station adjacent the paint applicator to push paint in the supply line to the paint applicator. The pigging element is then driven back under pneumatic pressure to the first receiving station to push paint in the supply line back to the paint supply and switching device or color changer to recover paint in the supply line.

There are several problems associated with the prior paint delivery and application systems described above, particularly in mass production applications, wherein the part to be painted is generally supplied to the applicator in a paint spray booth by a conveyor requiring a short cycle time. As will be understood by those skilled in this art, the longer the cycle time, that is the time required to change from a first paint to a second paint, the greater the expense. At present, the cycle time of a conventional paint supply and application system is at least about 30 seconds. To accommodate this cycle time, the manufacturer can either slow the conveyor through the paint booth or add additional paint application equipment. It would therefore be desirable to reduce the cycle time which is one object of this invention.

Another problem is associated with the electrical or electrostatic charge applied to the electrically conductive paint by the paint applicator during application, particularly with rotary electrostatic paint atomizers of the type commonly used in mass production applications. In a typical application, the color changer is at ground potential and thus the electrically charged paint applicator must be electrically isolated from the color changer during application of paint. This presents a particular problem when attempting to reduce cycle time. Other problems with conventional paint supply and application systems include waste of paint, cycle time for cleaning and flushing of the paint applicator and paint lines and changing of paint colors, particularly including but not limited to robotic paint systems.

Other problems associated with paint delivery and application systems of the type described herein, particularly for mass production applications, including automotive applications, generally relate to the precise metering of liquid coating or paint applied to the part because of differences in the temperature and viscosity of the liquid coating and different parts may be painted in the same line. Where paint canisters are utilized, it would also be desirable to use a nonconductive cylinder which does not expand or contract under varying conditions. In certain applications, for example, it would be desirable to provide an excess of available paint to compensate for variations in temperature and viscosity and return the excess paint to the color changer.

The paint delivery and application systems and methods of this invention solve the above-identified problems, including reduced cycle time, automatic switching of paint and rapid flushing of the paint applicator between applications and electrically isolates the color changer from the applicator permitting use of electrically conductive paint, including but not limited to water based paints. The paint delivery and application systems of this invention also eliminates waste of paint. The paint delivery and application systems and method of this invention is also easily adapted for robotic paint application systems using a rotary atomizer and applying electrically conductive paint.

SUMMARY OF THE INVENTION

As set forth above, the paint delivery and application systems and methods of this invention may be utilized to apply electrically conductive paint utilizing a conventional electrostatic rotary atomizer and is particularly, but not exclusively, adaptable to robotic paint applicators and overhead and side mounted paint applicators. The paint delivery and application systems and methods of this invention significantly reduce cycle time and substantially reduces or eliminates waste paint.

One preferred embodiment of the paint delivery and application system of this invention includes a color changer or paint supply switching device at ground potential preferably having at least two sources of paint under pressure, at least two paint canisters, a paint applicator, a first pair of separate supply lines connecting the paint supply switching device and the paint canisters, and a second pair of separate supply lines connecting the canisters to the paint applicator (in most cases an atomizer). Thus, with this embodiment of the paint delivery and application system of this invention, a first paint may be supplied from a first paint canister to the paint applicator while a second paint is supplied from the paint supply switching device to a second canister, significantly reducing the cycle time. As will be understood, the cycle time may be further reduced by utilizing three or more paint canisters connected in parallel between the paint supply switching device and the paint applicator. However, one preferred embodiment of this paint delivery and application system of this invention includes at least two paint canisters connected in parallel by paint supply lines between the color changer or paint supply switching device and the paint applicator.

Where the paint delivery and application system of this invention is utilized to deliver and apply electrically conductive paint, particularly with an electrostatic paint applicator, such as a conventional rotary electrostatic paint atomizer, at high voltage, the second paint canister receiving paint from the paint supply switching device must be electrically isolated from the paint applicator to avoid sparking or shorting of the pumps, etc. Similarly, the first canister supplying paint to the paint applicator must be electrically isolated from the paint supply switching device or color changer at ground potential. This is accomplished in one preferred embodiment of the paint delivery and application system of this invention by utilizing a unique pigging technology and the method of this invention as now described.

In one preferred embodiment of the paint delivery and application system of this invention utilizing pigging technology, the system includes a first supply line connecting the paint supply switching device or color changer and a first paint canister including a first pigging element movable in the first supply line between a first station adjacent the paint supply switching device and the first paint canister. The system further includes a second supply line connecting the first paint canister and the paint applicator including at least one second pigging element movable in the second supply line between a first station adjacent the first paint canister and a second station adjacent or within the paint applicator. The system further includes a third supply line connecting the paint supply switching device and a second paint canister including a third pigging element movable in the third supply line between a first station adjacent the paint supply switching device and a second station adjacent the second paint canister. Finally, this system includes a fourth supply line connecting the second paint canister and the paint applicator including a first station adjacent the second paint canister and a second station adjacent or within the paint applicator. With this system, the first canister may be electrically isolated from the paint supply switching device during application of the paint from the first canister through the paint applicator and the second paint canister may be electrically isolated from the paint applicator as the second canister is filled from the paint supply switching device by the method of this invention.

The methods of this invention utilizing the pigging technology described above include delivering a predetermined quantity or volume of a first paint from the paint supply switching device to the first canister through the first supply line. When the first paint canister has received substantially a full charge of paint, for example about 95% of the paint required for the application, the first pigging element is released into the first supply line, pushing the remainder of paint in the first supply line into the first paint canister. The pigging element thereby removes paint through the first supply line and electrically isolates the first paint canister from the paint supply switching device. In the disclosed embodiment, the pigging element is driven through the first supply line by a nonconductive fluid, such as air, creating a voltage block between the color changer and the first paint canister. The first paint is then delivered from the first paint canister to the paint applicator through the second supply line while the second paint canister is electrically isolated from the paint supply switching device by the pigging technology of this invention. The first paint may be delivered through the second paint line to the applicator by actuating a piston, for example, of the first paint canister. In one of the disclosed embodiments of the paint delivery and application system of this invention, the paint remaining in the second supply line between the first paint canister and the paint applicator is delivered to the paint applicator by a second pigging element by driving the second pigging element through the second supply line. That is, upon delivery of most of the paint from the first paint canister has been completed, the second pig is driven through the second supply line to deliver the remainder of the paint through the paint applicator. In another disclosed embodiment, wherein the first paint canister contains an excess of paint to accommodate variations in temperature and viscosity of the paint, the excess paint is returned to the first paint canister by a pigging element and the piston is again extended to return the remaining paint to the color changer to eliminate waste of paint as described further below.

While the first paint is being delivered to the paint applicator from the first paint canister, as described above, a second paint is delivered from the paint supply switching device to a second canister which is then electrically isolated from the paint applicator by the same method. That is, a second paint is delivered from the paint supply switching device to the second paint canister through the third supply line. In one disclosed embodiment, a third pigging element is then driven from the first pig station to the second pig station, thereby pushing the remainder of a predetermined quantity of second paint to the second paint canister and electrically isolating the second canister from the paint supply switching device as described. In the alternative embodiment described further below, the excess paint in the fourth paint supply line between the applicator and the second canister is returned to the second canister by the fourth pigging element and the piston is then extended to drive the remaining paint back to the color changer. The sequence is then repeated indefinitely.

As will now be understood, the paint canister receiving paint from the paint supply switching device is always electrically insulated from the paint applicator during filling, and the paint canister delivering paint to the paint applicator is always electrically isolated from the paint supply switching device, thereby avoiding arcing or damage to the pumps, etc. of the paint supply switching device, which is at ground potential. Further, the simultaneous application of one paint from a first paint canister while filling a second paint canister substantially reduces the cycle time by at least one half. In the first embodiment described above, substantially no paint is wasted because each canister is charged or filled with only a predetermined volume as required for each application. In the second embodiment, wherein the paint canisters are filled with an excess of paint, the excess paint is returned to the paint canisters and the piston of the paint canisters drive the remaining paint back to the color changer eliminating any waste of paint as described above.

The paint delivery and application systems of this invention may also be conveniently flushed with solvent. As will be understood, the preferred solvent will depend upon the paint or coating. When applying a water based paint, for example, the preferred solvent is deionized water. In one preferred embodiment of the paint delivery and application system of this invention, the paint supply switching device includes a source of solvent under pressure. Upon completion of the delivery of paint from the first paint canister, for example, the pigging elements are both located in the second station, wherein fluid can flow around the pigging elements. Solvent is then delivered through the first and second supply lines to the paint applicator to flush the supply lines and the paint applicator. The third and fourth supply lines may also be flushed by the same method. In a another preferred embodiment of the paint delivery and application system of this invention, a separate source of solvent is connected to the paint applicator through a solvent supply line for flushing the paint applicator, particularly when the second paint is identical to the first paint, further reducing the cycle time. Alternatively, in a second preferred embodiment of the paint delivery and application system of this invention, the second supply line between the first paint canister and the paint applicator and the fourth paint line between the second paint canister and the paint applicator each include at least two pigging elements and solvent is delivered between the pigging elements, such that upon delivery of the pigging elements to the applicator, the solvent between the pigging elements first flush the paint lines between the canister and the applicator and the paint is then delivered to the applicator through the clean lines.

In a preferred embodiment of the paint delivery and application system of this invention, the pigging elements are shuttled between the first and second pig stations by a non-conductive fluid such as pneumatic pressure to deliver paint, and electrically isolate the components of the system as described above. As will be understood, the pneumatic pressure may include any suitable non-conductive fluid. In one preferred embodiment, the first pig station is defined by a trunk line communicating with the supply or delivery line which receives the pigging element, such that paint or solvent may flow past the pigging element in the first station without flowing around the pigging element. A source of pneumatic pressure is then connected to the trunk line to drive the pigging element from the trunk line or first pig station to the second pig station. The pigging elements may be conventional in this type of system, such as a dumbbell-shaped pigging elements including resilient rings or the pigs may include opposed skirt portions which as described in a copending patent application wipe paint or solvent from the supply lines. In one preferred embodiment, the pigging elements include an encapsulated magnet and the pigging stations include a sensor which senses the location of the pigging element.

The paint delivery and application system of this invention may be utilized to deliver a predetermined volume of solvent to the delivery line between the paint canister and the paint applicator to flush the delivery line following application of paint. In the prior systems, solvent was delivered to the delivery lines in a timed sequence by opening the valve from a source of solvent under pressure to the delivery lines. However, the precise volume of solvent cannot be controlled by this method. In one described embodiment of the paint delivery and application system of this invention, wherein the paint canisters each include a reciprocable piston, paint is delivered from the paint canisters to the paint applicator through a delivery line by movement of the piston in the paint canister, thereby creating a continuous stream of paint in the delivery line from the paint canister to the paint applicator in the delivery line. The system further includes a source of solvent under pressure connected to the delivery line adjacent the applicator. The method of delivering a predetermined volume of solvent then includes delivering a predetermined volume of paint from the paint canister to the applicator by extending the piston in the paint canister creating a continuous stream of paint between the paint canister and the applicator, then delivering a predetermined volume of solvent to the delivery line by retracting the piston in the paint canister. As will be understood, the volume of solvent can thus be accurately controlled.

In one disclosed embodiment, the paint canisters are located on the arm of robotic paint applicators and the color changer is located outside the paint booth at ground potential. In a second embodiment, the paint canisters are located in a voltage block module located outside the paint booth permitting maintenance or service of the paint canisters without entering the paint booth as disclosed in a copending application. In a preferred embodiment of the piston-type paint canisters, the piston is gear driven by a servomotor providing precise metering of the paint, thereby eliminating the requirement for a metering pump on the robot and reducing cost. In a preferred embodiment of the paint delivery and application system of this invention utilizing a rotary atomizer which, as set forth above, applies a high voltage to an electrically conductive paint, the rotary atomizer includes at least one and preferably two pig stations which are referred to in this description as the second pig stations. Further, in a preferred embodiment of the paint canisters having a reciprocable piston, the first pig stations may be located in or on the paint canister.

As mentioned above, the piston-type paint canister driven by dosing or metering drive means eliminates the requirement of a metering pump (usually a gear pump) adjacent the atomizer. This makes it possible to place the second pig station within the atomizer, thereby reducing paint and solvent losses to a minimum. Reference is made in this regard to EP 1314480.

Other advantages and meritorious features of the paint delivery and supply systems and methods of this invention will be more fully understood from the following description of the preferred embodiments, the appended claims and the drawings, a brief description of which follows.

DESCRIPTION OF THE PREFERRED EMBODIMENTS

Figure 1:
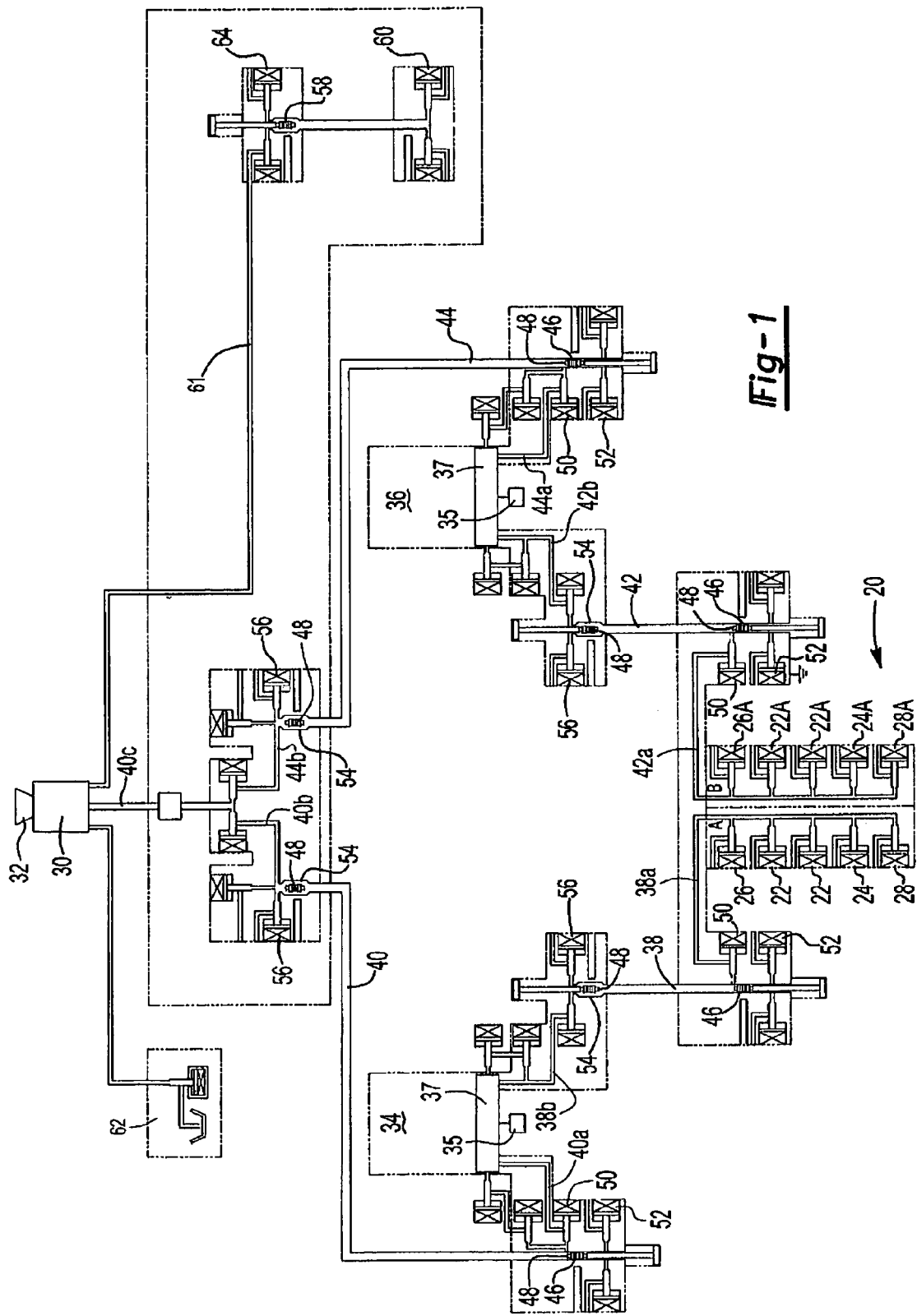
FIG. 1 is a fluid diagram of one embodiment of the paint delivery and application system of this invention.

The schematic or fluid diagram of FIG. 1 illustrates the components of one embodiment of the paint delivery and application system of this invention. The paint delivery and application system illustrated in FIG. 1 includes a color changer or paint supply switching device 20 at ground potential including a plurality of ports each connected to a source of paint under pressure 22, a port connected to a source of solvent under pressure 24, ports connected to a source of air or pneumatic pressure 26 and a solvent recovery port 28. The color changer 20 in this embodiment of the invention may be generally conventional except that in the disclosed embodiment, the color changer 20 is divided in two identical components in parallel, wherein the second component includes the suffix "A" for ease of reference. The number of components will depend upon the number of paint canisters. As will be understood, the number of ports 22 which receive paint under pressure will depend upon the number of paints to be applied by the paint delivery and application system of this invention and the color changer may include any number of ports depending upon the application. Further, the embodiments of the paint delivery and application system of this invention may be utilized to apply any coating or paint, as defined above, wherein the second paint may either be identical to the first paint or a different paint, such as a different color paint. The paint delivery and application system and method of this invention is also particularly, but not exclusively, adapted for application of an electrically conductive paint, such as a water based paint, now utilized in many automotive and appliance applications.

The paint delivery and application system disclosed in FIG. 1 further includes a paint applicator 30, such as a conventional electrostatic rotary atomizer at high voltage having a rotary bell cup 32 which applies an electrostatic charge to an electroconductive paint applied to a substrate at ground potential (not shown). As will be understood, however, any paint applicator or paint gun may be utilized with the paint delivery and application system of this invention. The system further includes at least two piston-type paint canisters 34 and 36. However, as set forth above, the paint delivery and application system of this invention may include three or more paint canisters to further reduce the cycle time. In the disclosed embodiment, the paint canisters 34 and 36 each include a piston 37 which reciprocates within the chamber of the paint canisters 34 and 36 to receive or discharge paint as will be understood by those skilled in the art. The paint canisters 34 and 36 may also include a pressure transducer 35 which measures the pressure of the paint in the paint canister and the transducers may be connected to a control module (not shown) of the paint delivery and application system of this invention.

The color changer or paint supply switching device 20 in this embodiment is connected by a first supply line 38 to a first paint canister 34. As will be understood, the designation of paint canister 34 as the first paint canister is for purposes of description only. The first paint canister 34 is then connected to the paint applicator 30 by a second supply line 40. Similarly, the color changer 20 is connected to the second canister 36 by a third supply line 42 and the second paint canister 36 is connected to the applicator 30 by a fourth supply line 44. As will be understood by those skilled in this art, FIG. 1 is a schematic illustration of one preferred embodiment of a paint delivery and application system illustrating the method of this invention and the description thereof does not include details which would be understood by those skilled in the art and are not relevant to the method or apparatus of this invention. For example, the color changer 20 or more particularly the ports 22, 24, 26 and 28, are connected to the first delivery line 38 by a delivery line 38a and from the second pig receiver station 54 by line 38b in FIG. 1. Similarly, the paint canister 34 is connected to the second delivery line 40 by delivery line 40a in the schematic illustration. Similarly, the delivery line 40 is connected to the applicator by lines 40b and 40c. Similarly, the color changer 20 is connected to the third delivery line 42 by line 42a and the second pig receiver station 54 is connected to the second paint canister 36 by line 42b. The paint canister 36 is then connected to the fourth delivery line 44 by line 44a and the second pig station 54 is then connected by line 44b to line 40c connected to the applicator 30. As described in a copending application, the delivery lines, particularly delivery lines 38, 40, 42 and 44, are preferably formed of a transparent or translucent polymer including a friction resistant inner layer, an intermediate dielectric material to prevent arching, and a thin outer layer of a hard plastic to prevent damage to the delivery or supply line.

Each of the supply lines 38, 40, 42 and 44 include a first pig or pigging element receiver station 46 which, in the disclosed embodiment, is a trunk line communicating with the supply line, such that the pig or pigging element 48 in each of the first pig stations 46 does not block the inlet 50 to the paint supply lines. Each of the first pig stations 46 also includes a pneumatic pressure inlet 52 to drive the pig or pigging element 48 to the second pig receiver station 54. The second pig receiver station 54 includes a chamber configured to receive the pigging element 48 while permitting fluid flow around the pigging element in the second pig receiver station 54. The second pig receiver station 54 also includes a port 56 connected to a source of pneumatic pressure, such that the pigging element 48 may be shuttled back and forth between the first receiver station 46 and the second receiver station 54 as also known in the art. That is, the first pigging element 48 may be pushed from the first pig receiver station 46 to the second pig receiver station 54 by pneumatic pressure received from inlet 52 and returned from the second pig receiver station 54 to the first pig receiver station by pneumatic pressure received through air inlet 56. As will be understood, the pigging element 48, as it is reciprocated through the supply lines 38, 40, 42 and 44 wipes or scrapes the supply lines in a conventional manner. As will be understood, the pigging elements of this embodiment may be driven by any fluid pressure and thus the apparatus of this invention is not limited to air or pneumatic pressure. However, where the paint is a conductive paint and thus the method requires electrically isolating the color changer 20 from the paint canisters 34 and 36 during delivery of conductive paint to the applicator 30, the fluid is preferably nonconductive, such as air.

The method of delivering and applying paint of this invention with the embodiment of the paint delivery and application system shown in FIG. 1 may now be described, as follows. A first paint is delivered from one of the inlets or ports 22 of the color changer or paint supply switching device 20 through first supply line 38 to the first paint canister 34. As paint is received by the first canister 34, the piston 37 is pushed into the canister as will be understood by those skilled in the art. When a predetermined quantity of the first paint is received by the first canister 34, such as 95% of the first paint required for the application, the pigging element 48 in the first receiver station 46 is driven by pneumatic pressure through the first supply line 38, driving or pushing the first paint remaining in the supply line 38 into the first canister 34 completing the charge of paint. For example, the pressure transducer 35 may be used to measure the paint pressure and thus the movement of the piston 37 in the paint canister until 95% of the required charge or volume of paint for example is received by the first canister 34 and the pigging element 48 is then driven under pneumatic pressure from the first station 46 to the second station 54, delivering a preprogrammed or predetermined charge of paint to the first paint canister 34, such that substantially no paint is wasted and the canister 34 is then electrically isolated from the color changer 20.

Paint is then delivered by the first canister 34 to the applicator 30 through the second supply line 40 such as by moving the piston 37 of the paint canister 34 toward the inlet. The first paint is thus delivered to the applicator 30 and applied by the applicator 30 to a substrate, such as a vehicle body (not shown). When a substantial portion of the first paint is delivered to the applicator 30, such as 95%, the pigging element 48 in the first receiver station 46 of the second supply line 40 is driven under pneumatic pressure through the second supply line 40 where it is received in the second receiver station 54 as described above. Thus, substantially all of the first paint received by the first paint canister 34 is delivered to the paint applicator 30. However, in this embodiment, a dump 62 is provided for receipt of excess paint or solvent. If the second paint to be applied to the substrate by applicator 30 is the same as the first paint, the entire system need not be flushed with solvent. In this embodiment of the paint delivery and application system of this invention, a separate solvent wash for the paint applicator 30, and particularly the rotary bell cup 32, is provided. In the disclosed embodiment, the pigging element 58 is initially located adjacent the solvent inlet 60. The solvent inlet 60 is then open, driving the pigging element 58 to the receiver station where the solvent flows around the pigging element 58 and through a separate line 61 to the applicator 30 further reducing the cycle time when the second paint supplied to the applicator 30 is the same as the first paint. Upon completion of flushing the applicator 30, the pigging element 58 is returned to its initial position by pneumatic pressure received through inlet 64.

Where the second paint to be supplied to the applicator 30 is different from the first paint, the first and second supply lines 38 and 40, the face of the piston 37 and the paint applicator 30 may be flushed with solvent, wherein solvent under pressure is received through inlet 24 and the solvent is then delivered through the first supply line 38, the solvent is received around the pigging element 48 in the second station 54 and then delivered through the second supply line 40 to the applicator 30, thereby flushing the system which received the first paint.

As described above, the paint canisters of the paint delivery and application systems of this invention work in tandem. Thus, while a first paint is delivered from the first canister 34 to the paint applicator 30, as described above, a second paint is delivered under pressure from one of the inlets 22A of the color changer or paint supply switching device 20 to the second paint canister 36 as described above in regard to paint canister 34. That is, a substantial majority, such as 95%, of a second paint, is delivered under pressure from one of the inlets 22A of the color changer 20 to the second paint canister 36 through the third supply line 42. Then, the pigging element 48 is driven under pneumatic pressure from the first receiver station 46 to the second receiver station 54, thereby delivering all of the second paint to the paint canister 36 and the paint and paint canister 36 is then electrically isolated from the color changer 20 as described above. Thus, the second paint canister 36 is being charged with a second paint as the first paint is delivered from the first canister 34 to the applicator 30. Then, upon completion of the delivery of the first paint to the applicator 30 and solvent wash, if necessary, the second paint is delivered from the second canister 36 to the applicator 30 which is electrically isolated from the paint supply switching device 20 as described above. That is, the piston 37 is reciprocated toward the outlet end, driving paint through the fourth supply line 44. Finally, when substantially all of the second paint is delivered to the applicator 30, the pigging element 48 pushes the remainder of the second paint to the applicator under pneumatic pressure received through inlet 52. The sequence is then repeated indefinitely, wherein the first paint canister 34 is charged with paint from the color changer 20 as the second paint is applied through the applicator 30, wherein the first paint canister is electrically isolated from the paint applicator 30 as described above.

Figure 2:
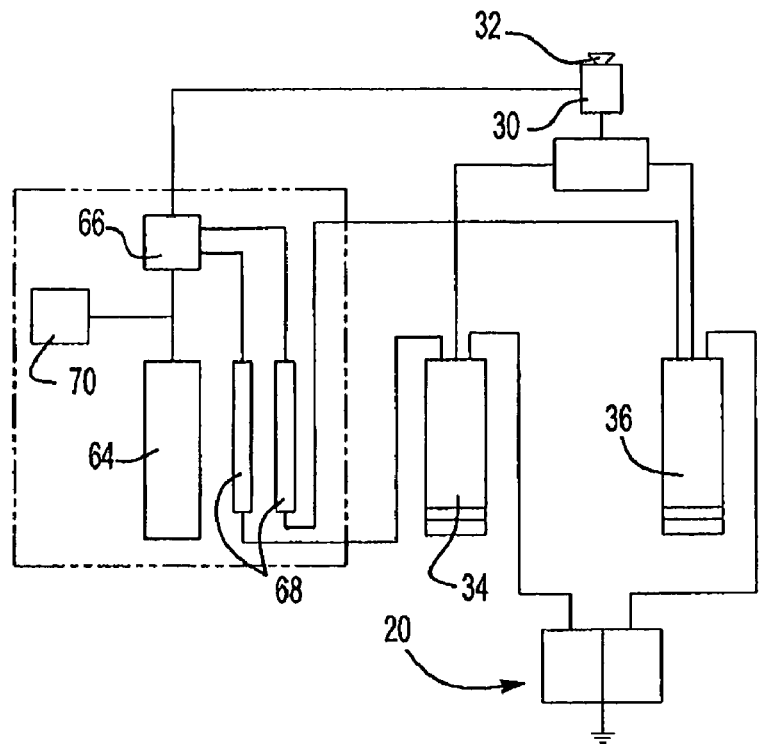
FIG. 2 is an electrical diagram of one embodiment of the paint delivery and application system of this invention.

FIG. 2 is a schematic illustration of a suitable wiring diagram for the paint delivery and application systems of this invention. As shown, the color changer 20 is always at ground. The system includes a power supply 64, which is connected to a voltage divider 66. The voltage divider 66 is connected to the applicator 30 to electrostatically charge the rotary bell 32. The voltage divider 66 is also connected through resisters 68 to the paint canisters 34 and 36, as shown. The electrical system also includes a ground switch 70.

Figure 3:
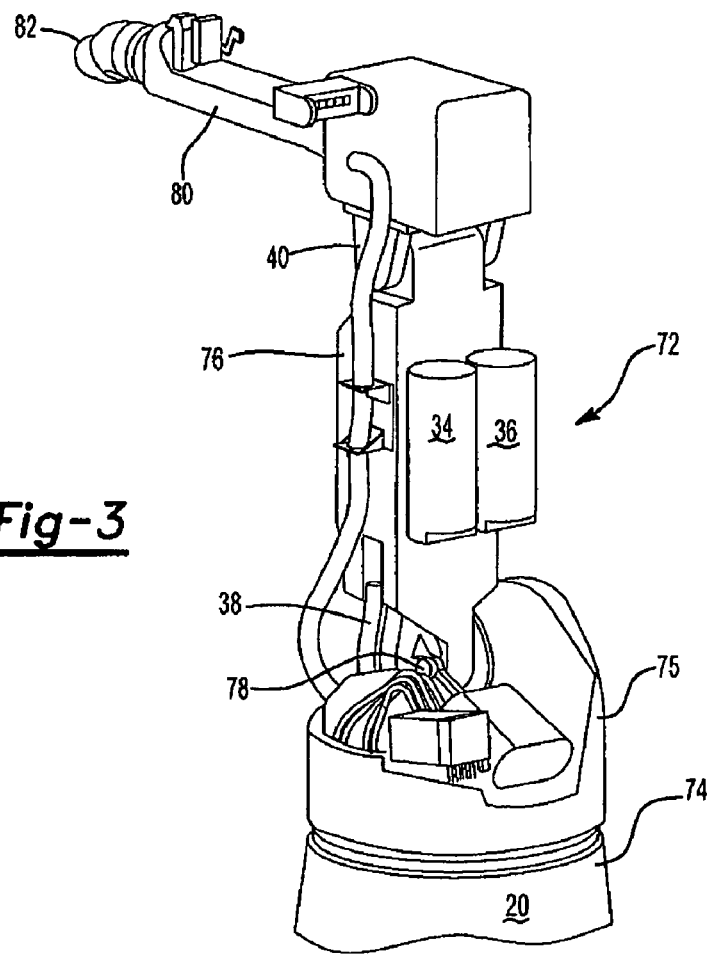
FIG. 3 is an illustration of a robot paint delivery system incorporating the paint delivery and application system shown in FIGS. 1 and 2.

As described above, the paint delivery and application systems of this invention may be utilized in any conventional paint application system including conventional overhead and side mounted applicators and may include a plurality of rotary atomizers applying paint to a vehicle body or the like, wherein each of the rotary atomizers are connected to a color changer and the system preferably includes at least two paint canisters connected in parallel between the applicator and the color changer as described above in regard to FIG. 1. However, the paint delivery and application systems of this invention are adaptable to a robotic paint application system as shown in FIG. 3. FIG. 3 illustrates a generally conventional robotic paint applicator 72 modified to include the paint delivery and application system of this invention illustrated in FIG. 1. That is, the robotic paint applicator 72 includes a base member 74 which is typically mounted on the floor of the paint booth (not shown) and an intermediate member 75 which is rotatable on the base member 74. The robotic paint applicator includes a main arm 76 which is pivotally supported on the intermediate member 75 by pivot 78 and controlled by a pneumatic piston. The robotic paint applicator may also include an upper arm 80 which is pivotally mounted on the main arm 76, as shown, and the paint applicator (not shown) is supported by a multi-axis arm or wrist 82 as is known in this art. In the disclosed embodiment, the paint canisters 34 and 36 of the paint delivery and application system of this invention are mounted on the main arm and the color changer 20 is mounted on the base member 74. The first and second supply lines 38 and 40, respectively, are partially shown in FIG. 3, which are respectively connected to the color changer 20 and the applicator (not shown). As described above, however, the paint delivery and application system of this invention is not limited to robotic paint application systems.

The second embodiment of the paint delivery and application system of this invention shown in FIGS. 4 to 24 differs from the embodiment previously described in several respects including that the paint canisters may be located outside the paint booth improving maintenance, and the paint lines from the paint canisters to the applicator include at least two pigging elements providing automatic flushing of the delivery lines and the applicator and a predetermined excess paint is provided to account for differences in viscosity and temperature and the excess paint is returned to the color changer. As described in a copending application assigned to the assignee of this application, the paint canisters utilized in the embodiment of the paint delivery and application system disclosed in FIGS. 4 to 24 preferably includes a piston which is driven by a servomotor or the like providing accurate metering or dosing of the paint received in the paint canisters and which drive paint from the paint canisters to the paint applicator. The canisters thus act as dosing devices. As further disclosed in the copending applications, the canisters are preferably formed of a nonconductive material, such as a ceramic, which does not expand or contract during temperature variations.

Figure 4:
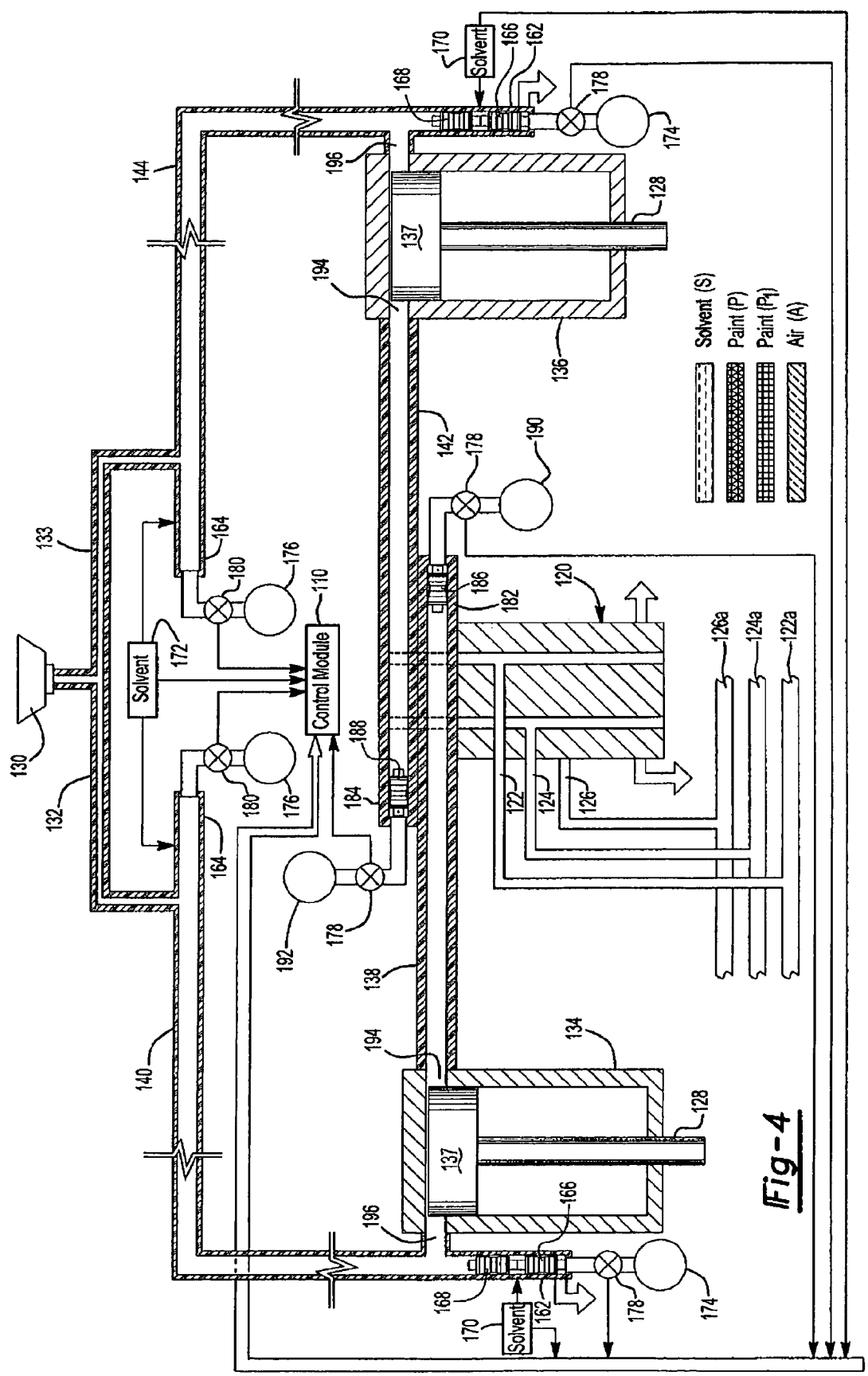
FIG. 4 is a schematic illustration of an alternative embodiment of the paint delivery and application system of this invention.

FIG. 4 is a schematic illustration of an alternative embodiment of the paint delivery and application system of this invention which includes a color changer 120 which, as described above, includes a number of ports or lines 122, 124 and 126, etc. each connected to a source of liquid paint by lines 122a, 124a 126a etc. As set forth above, the paint delivery and application systems of this invention are particularly, but not exclusively adapted for delivery and application of an electrically conductive paint, such as a water based paint now utilized by the automotive and appliance industries. The color changer 120 must be at ground potential because the color changer is connected to sources of conductive paint which are at ground potential. The color changer is then connected by a first delivery or supply line 138 to a first paint canister 134 and the first paint canister 134 is connected by a second supply line 140 to a paint applicator 130 by line 132. In this embodiment, the color changer or paint supply switching device 120 is also connected by line 142 to a second paint canister 136 by a third supply line 142 and the second paint canister 136 is connected by supply line 144 to the paint applicator 130 by line 133. As described above, the first paint canister 134 includes a piston 137 having a piston rod 128, wherein the piston rod 128 may be connected to a servomotor or the like (not shown) which reciprocates the piston 137 in an accurate and controlled manner to receive and deliver paint under pressure to the applicator 130 as described below. Similarly, the second paint canister 136 includes a piston 137 connected to a piston rod 128 which reciprocates the piston 137 in the second paint canister 136 to receive paint from the color changer 120 and drive paint to the applicator 130 as described below.

In this embodiment of the paint delivery and application system of this invention, the second and fourth supply or delivery lines 140 and 144, respectively, each include a first pig station 162 adjacent the paint canisters 134 and 136 and a second pig station 164 adjacent the applicator 130. In one preferred embodiment, the pig stations 162 and 164 are continuations or trunk lines of delivery or supply lines 140 and 144. In the disclosed embodiment, the first and second pig stations 162 and 164 are configured to receive two pigging elements, including a first pig or pigging element 166 and a second pig or pigging element 168 and the first and second pig stations 162 and 164 each include a source of solvent under pressure, including a source of solvent 170 communicating with the first pig stations 162 and a source of solvent under pressure 172 communicating with the second pig stations 164. As described below, the sources of solvent 170 and 172 are each adapted to deliver solvent under pressure between the first and second pigging elements 166 and 168. The first and second pig stations 162 and 164 further include a source of nonconductive fluid under pressure including a source of nonconductive fluid under pressure 174 communicating with the first pig stations 162 and a source of nonconductive fluid under pressure 176 communicating with the second pig stations 164. A valve 178 controls the flow of nonconductive fluid to the first pig stations 162 and a valve 180 controls the flow of nonconductive fluid to the second pig stations 164. As set forth above, the preferred solvent will depend upon the application, wherein deionized water is a preferred solvent for water based paints. A suitable nonconductive fluid is pressurized air which electrically isolates the paint canisters 134 and 136 from the paint applicator 130 as described below.

In the disclosed embodiment, the paint supply switching device or color changer 120 also includes two pig stations, including a first pig station 182 communicating with the first supply or delivery line 138 and a second pig station 184 communicating with the third supply line 142 each having a pig or pigging element 186 and 188, respectively. The pig stations 182 and 184 of the paint supply switching device or color changer 120 further include a source of nonconductive fluid under pressure, including a source of nonconductive fluid 190 communicating with the first pig station 182 and a source of nonconductive fluid under pressure 192 communicating with the second pig station 184. Each of the sources of nonconductive fluid under pressure 190 and 192 include a valve 178 controlling the supply of nonconductive fluid. As described above with regard to the first and second pig stations 162 and 164 which communicate with the supply or delivery lines 140, the pig stations 182 and 184 in a preferred embodiment of the paint delivery and application system of this invention are preferably trunk lines of the first and third supply or delivery lines 138 and 142, respectively, such that paint can flow past the pigging elements 186 and 188 as described above with regard to the pig stations 162 and 164. As described below, the inlet 194 of the paint canisters 134 and 136 also serve as a pig station which receive the pigging elements 186 and 188 and the paint canisters include an outlet 196 which communicates with the second and fourth supply or delivery lines 140 and 144. The inlet 194 of the paint canisters 134 and 136 may be configured to receive paint or solvent around the pigging elements and the pigging elements may be releasably held in the inlet of the paint canisters 134 and 136 (not shown) as is well known in this art.

The embodiment of the paint delivery and application system shown in FIG. 4 further includes a control module 110 connected to the valves 178 and 180 and to the solvent sources 170 and 172 which controls the sequence of the introduction of solvent and a nonconductive fluid utilized in the method of this invention as described below. Having described an alternative embodiment of the paint delivery and application system of this invention with regard to FIG. 4, the method of delivering and applying a conductive paint with this embodiment of the apparatus will now be described with regard to FIGS. 5 to 24, as follows.

Figure 5:
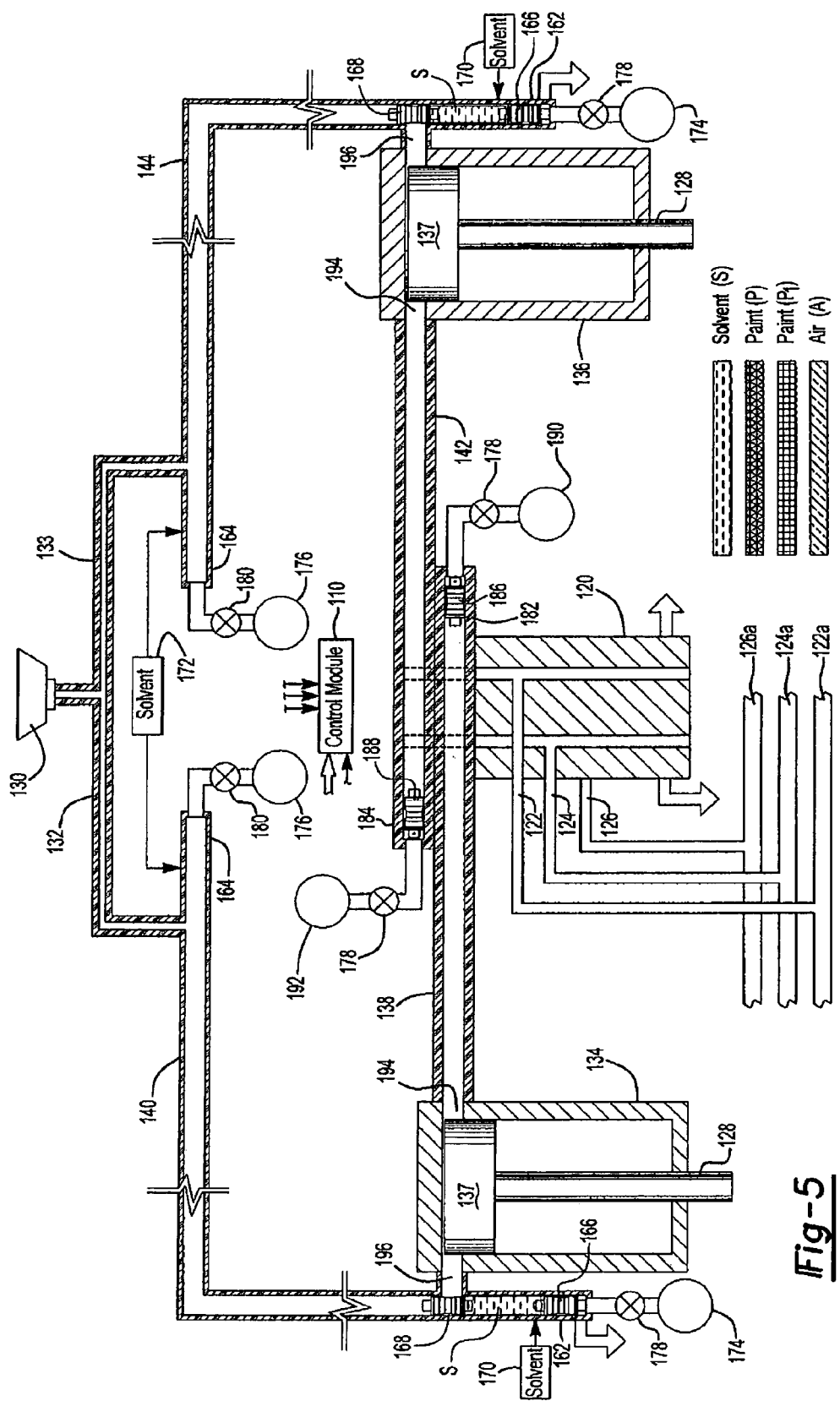
FIGS. 5 to 24 are schematic illustrations of the alternative embodiment of the paint delivery and application system shown in FIG. 4 illustrating an embodiment of the method of delivering and applying a conductive paint of this invention.

As will be understood, the paint delivery and application system shown in FIG. 4 may be utilized to deliver and apply a conductive paint, such as a water based paint, wherein the paint supply switching device or color changer 120 is at ground potential and the applicator 130 is at a high electrical voltage, such as a conventional electrostatic rotary atomizer, which applies a high voltage to the conductive paint as it is applied to a substrate generally at ground potential, such as a vehicle body (not shown). In one preferred embodiment of the method of delivering and applying a paint to a substrate of this invention, a first step is to deliver solvent under pressure from the source 170 between the pigging elements 166 and 168 in the first pig stations 162 as shown in FIG. 5. The solvent S thereby spaces the pigging elements 166 and 168 as shown, wherein the second pigging element 168 blocks the outlet 196 of the paint canisters 134 and 136, as shown. Paint P may then be delivered from one of the delivery lines to the color changer and from the color changer to the first paint canister 134. As described above, the paint supply switching device or color changer 120 is connected by lines 122, 124, 126, etc. to sources of conductive liquid paint by lines 122a, 124a, 126a, etc.

FIG. 5 illustrates the delivery of solvent S between the pigging elements 166 and 168 in the first pig station 162 from the source of solvent 170. At set forth above, the control module 110 shown in FIG. 4 controls the valves 178 and 180 and the sources of solvent 170 and 172. The computer module is programmed to introduce solvent when the pigging elements 166 and 168 are located either in the first pig station 162 or the second pig station 164 as shown in the following sequence of drawings.

Figure 6:
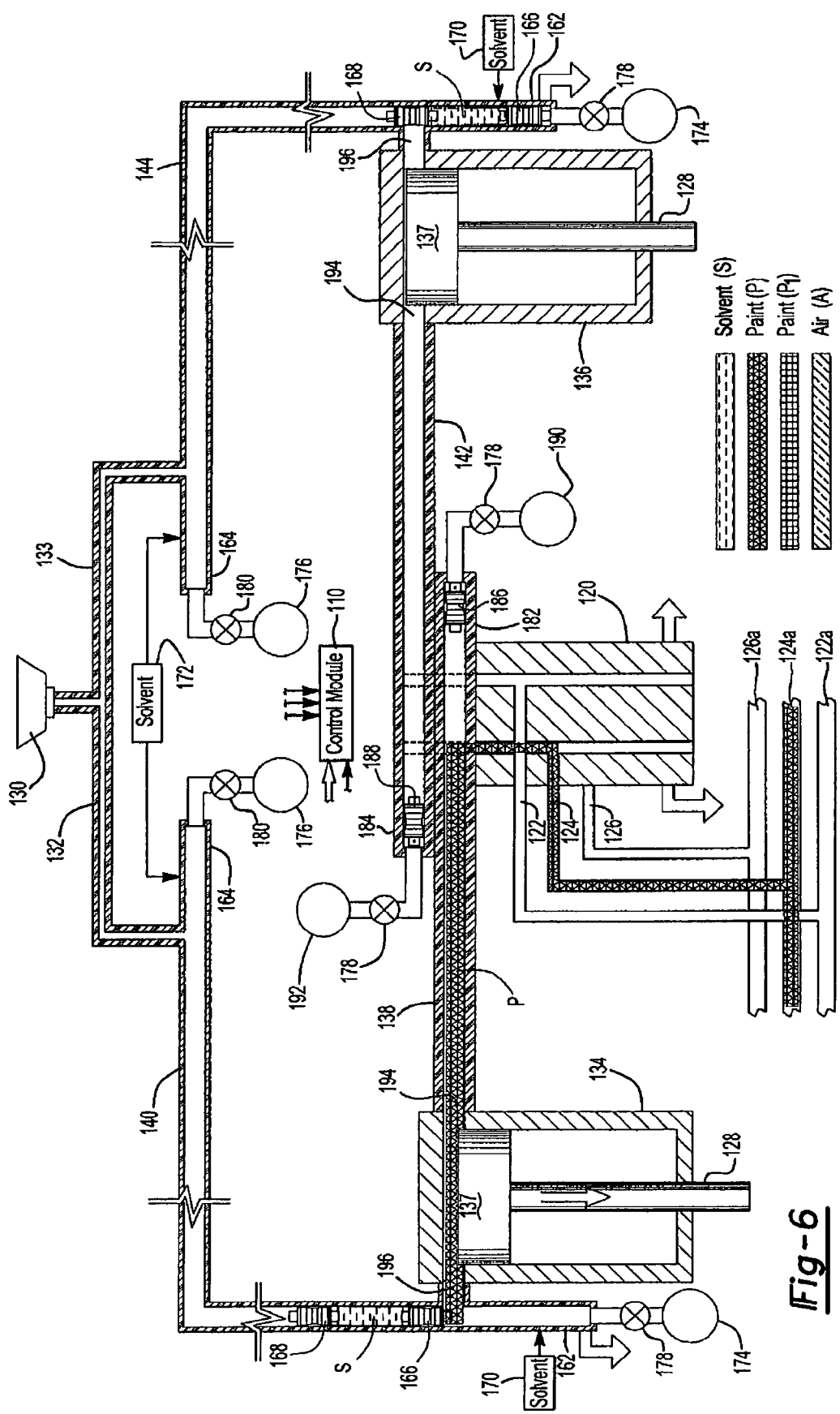
Figure 7:
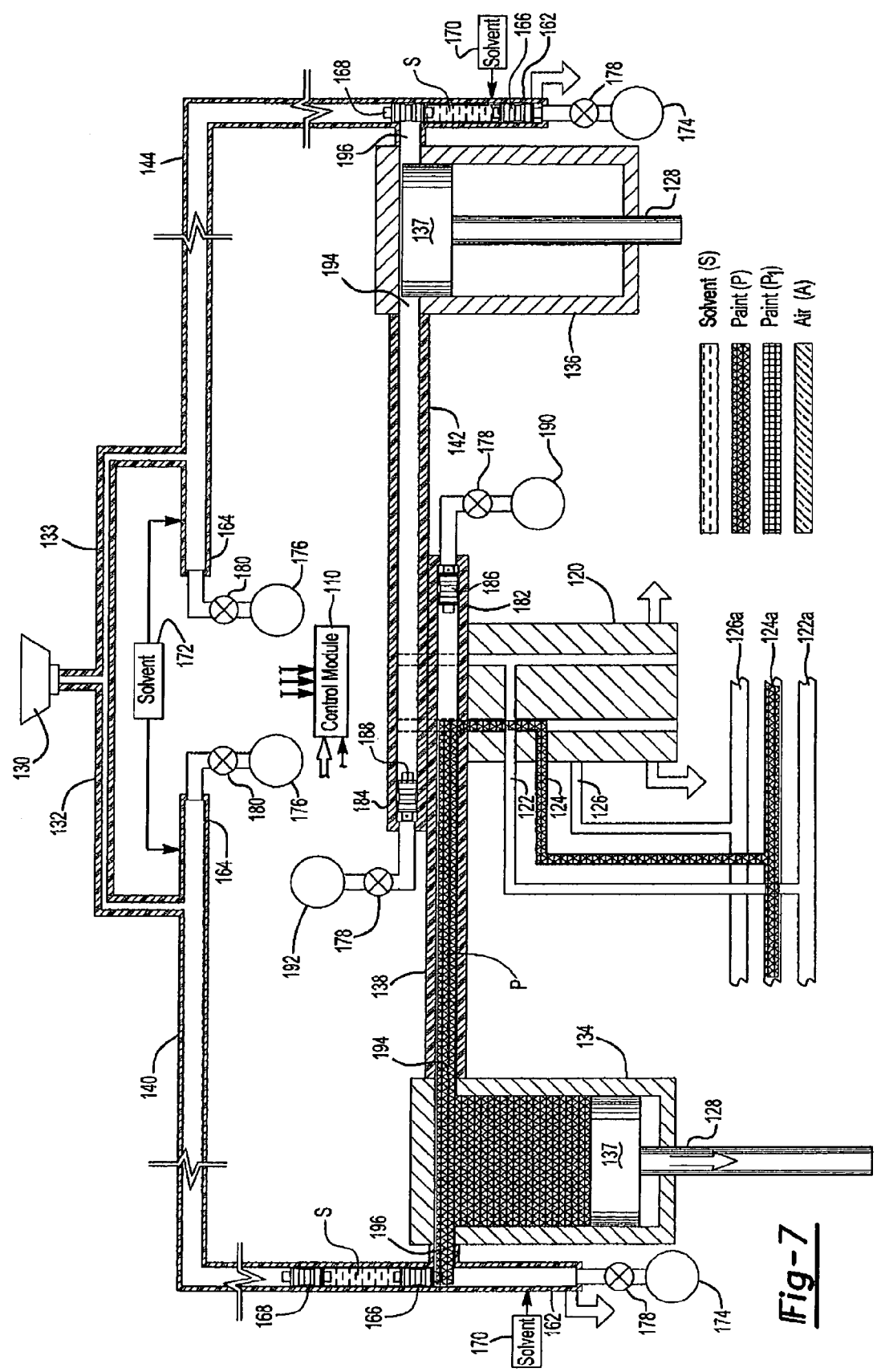
Figure 8:
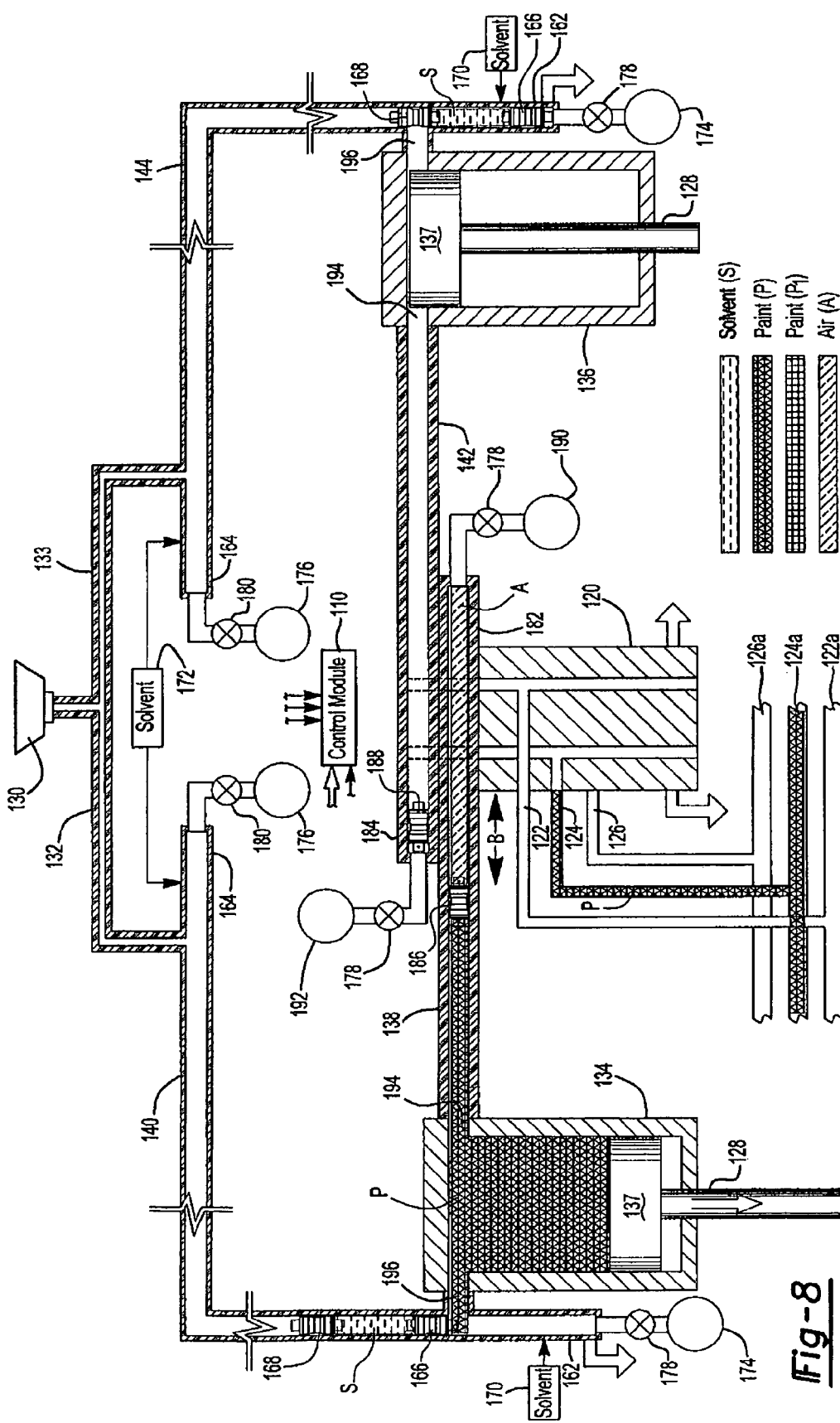
Figure 9:
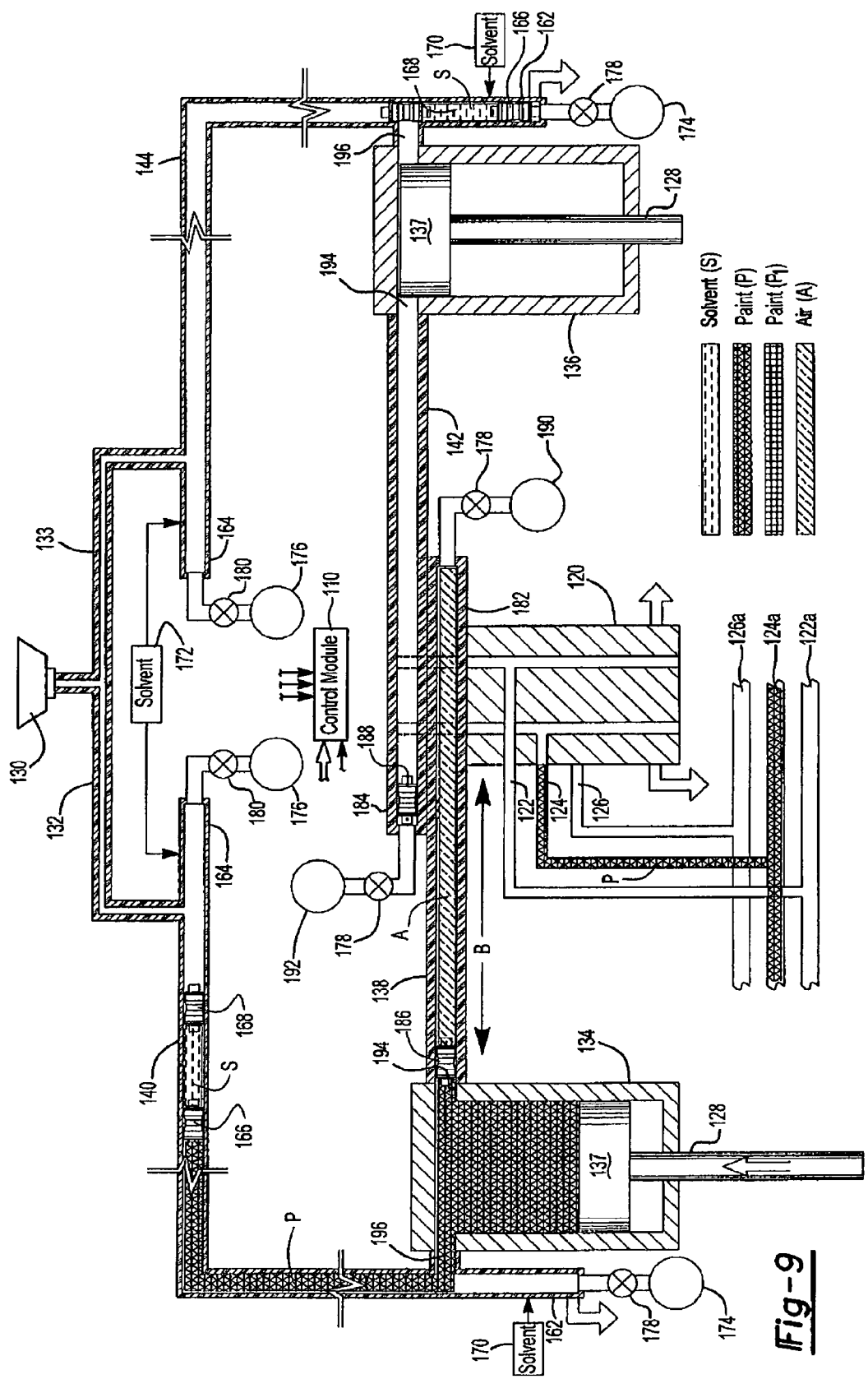
Figure 10:
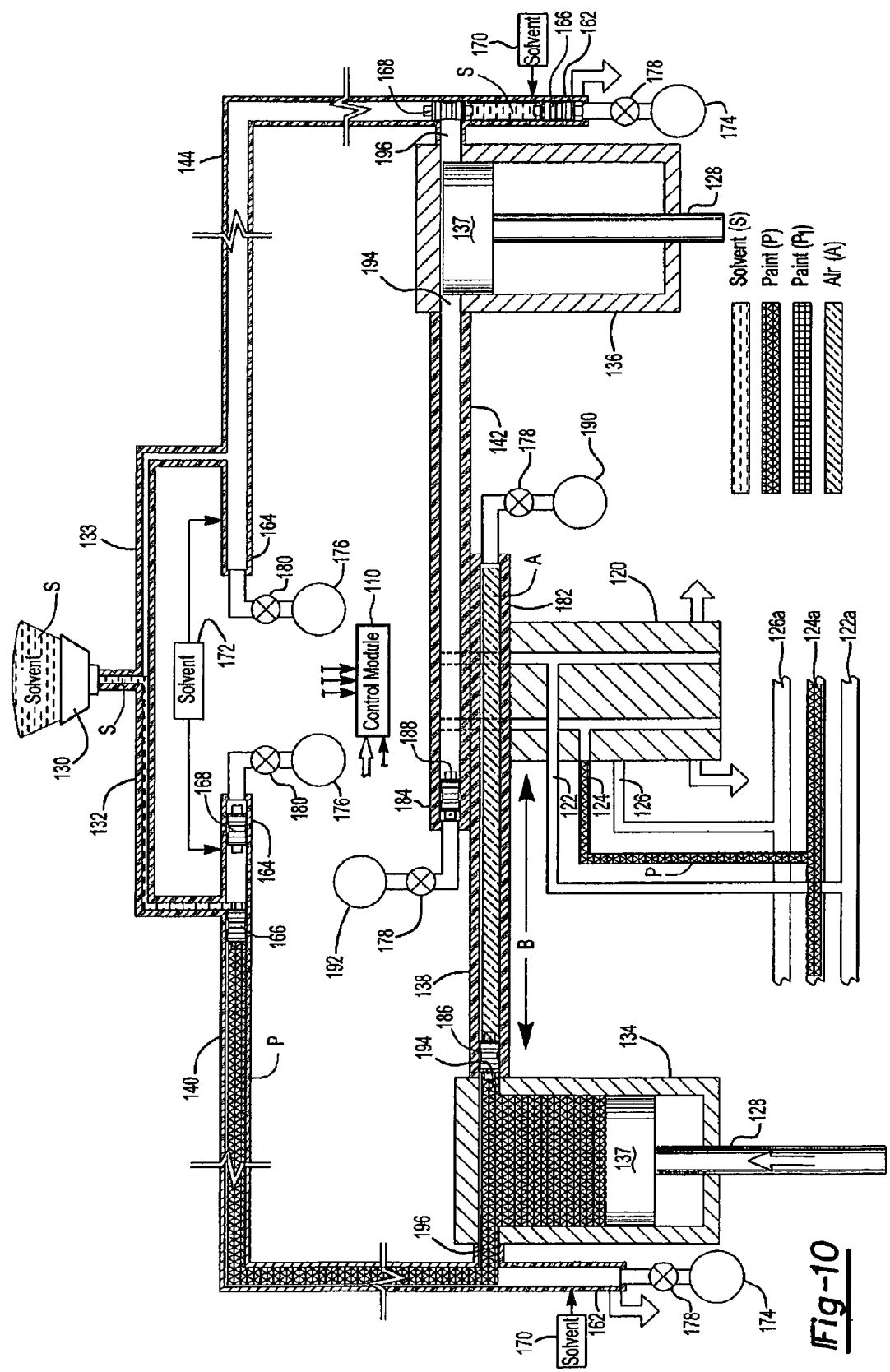
Figure 11:
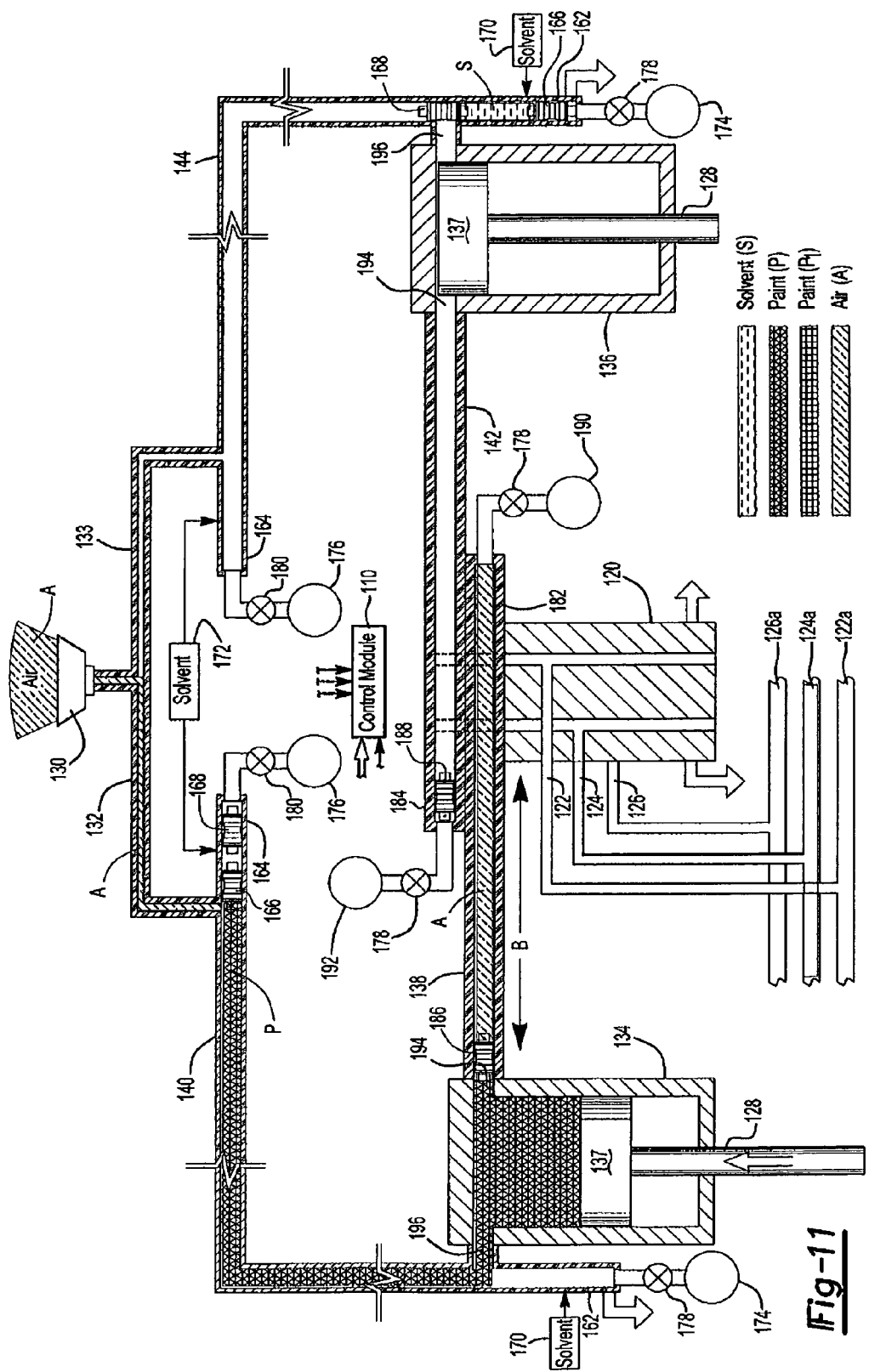
Figure 12:
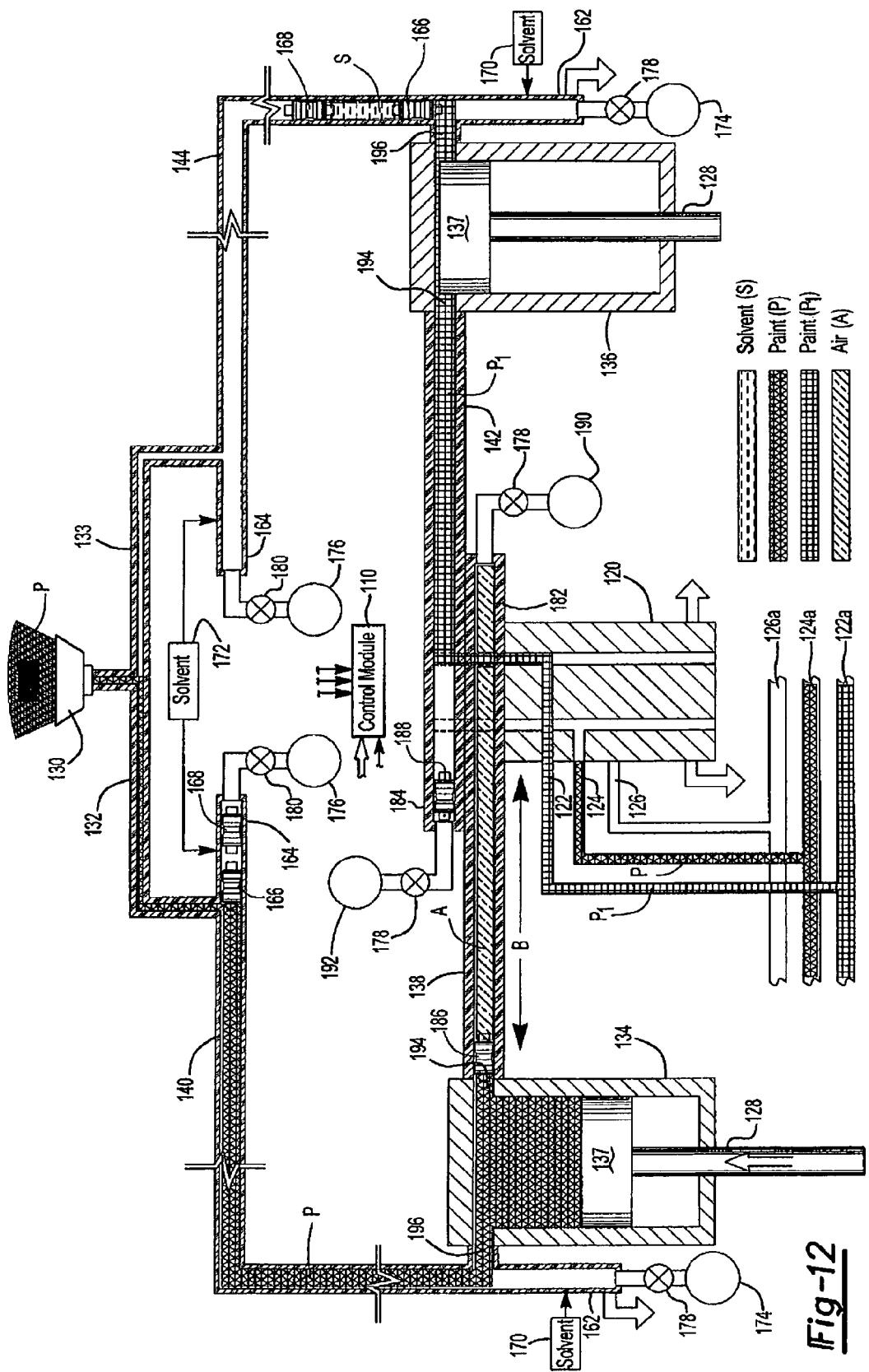

In FIG. 6, conductive paint P is received through line 124 to the paint supply switching device or color changer 120 and the paint is then received through the first supply or delivery line 138 to the first paint canister 134. Simultaneously, the valve 178 to the source of nonconductive fluid 174 to the first pig station 162 is opened sufficiently to drive the first and second pigging elements 166 and 168 into the second supply or delivery line 140 as shown in FIG. 6. As shown in FIG. 6, the piston 137 of the first paint canister 134 is simultaneously withdrawn to receive paint P in the first paint canister 134 as shown in FIG. 6. As shown in FIG. 7, the piston 137 of the first paint canister 134 is withdrawn until a predetermined volume or "dose" of paint P is received by the first paint canister as shown in FIG. 7. The first pigging element 186 of the paint supply switching device or color changer 120 is then driven by nonconductive fluid through the first supply line 138 by opening valve 178 of source 190, thereby electrically isolating the paint supply switching device 120 from the first paint canister 134 as shown by B in FIG. 8. The pigging element 186 also delivers paint remaining in the first delivery line 138 to the first paint canister 134 as shown in FIGS. 8 and 9. As shown, the first pigging element 186 of the paint canister 134 is then received at the inlet 194 of the first paint canister 134 and the first paint canister is then fully charged with a predetermined volume or dose of paint P for delivery to the paint applicator 130 and the paint supply switching device or color changer 120 is then electrically isolated from the first paint canister 134 creating a voltage block B as shown in FIG. 9. The piston 137 of the first paint canister 134 is then reversed as shown in FIGS. 10 and 11, thereby driving paint P and the first and second pigging elements 166 and 168 with solvent S therebetween to the second pig station 164, and delivering solvent through line 132 to the applicator 130, purging the first delivery line 140 and the applicator 130 as shown in FIG. 11. Continued driving of the piston 137 of the first paint canister 134 toward the outlet 196 drives paint P through the first supply line 140 and line 132 to the applicator 130 as shown in FIG. 12, thereby delivering paint through the applicator 130 to a substrate (not shown) and the paint is thereby electrically charged by the applicator as described above. The electrically charged paint P in the second supply or delivery line 140 in one preferred embodiment of the method of this invention is a continuous stream of electrically charged paint from the paint applicator 130 to the paint in the first paint canister 134. However, as described above, the paint P and the first paint canister 134 are electrically isolated from the paint supply switching device or color changer 120 as shown in FIG. 12 as the paint is delivered through the paint applicator 130 to a substrate.

Figure 13:
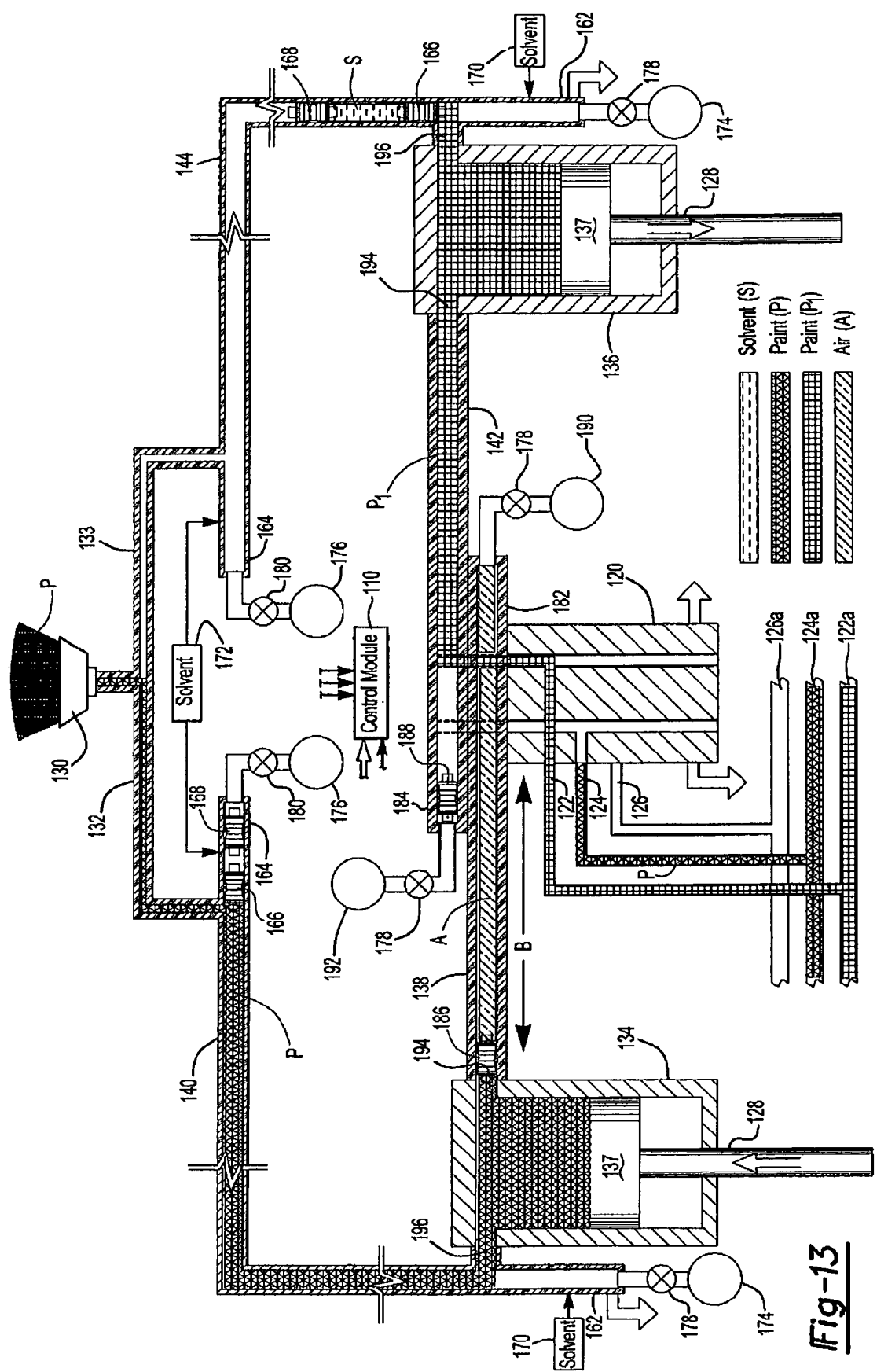
Figure 14:
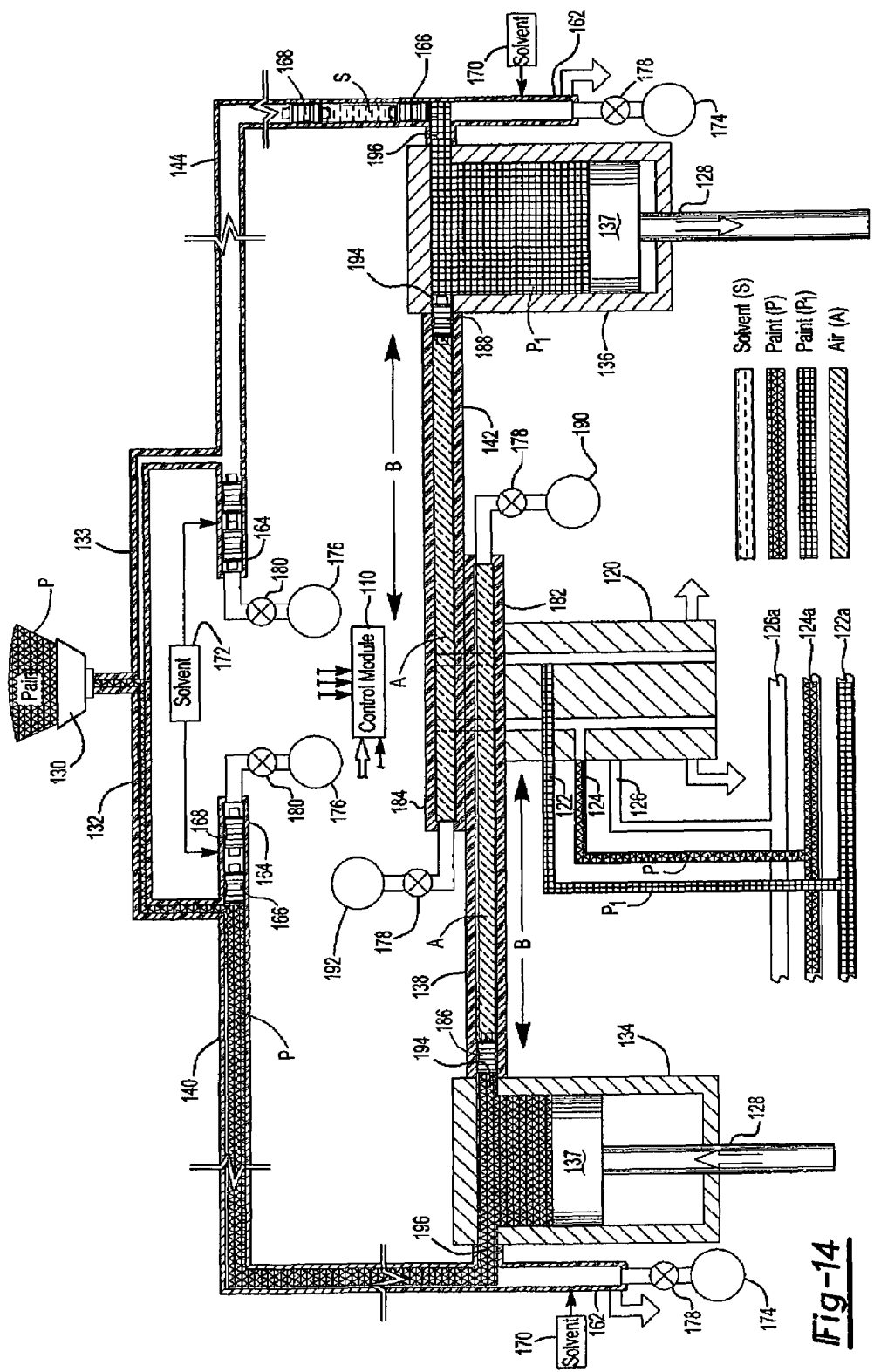
Figure 15:
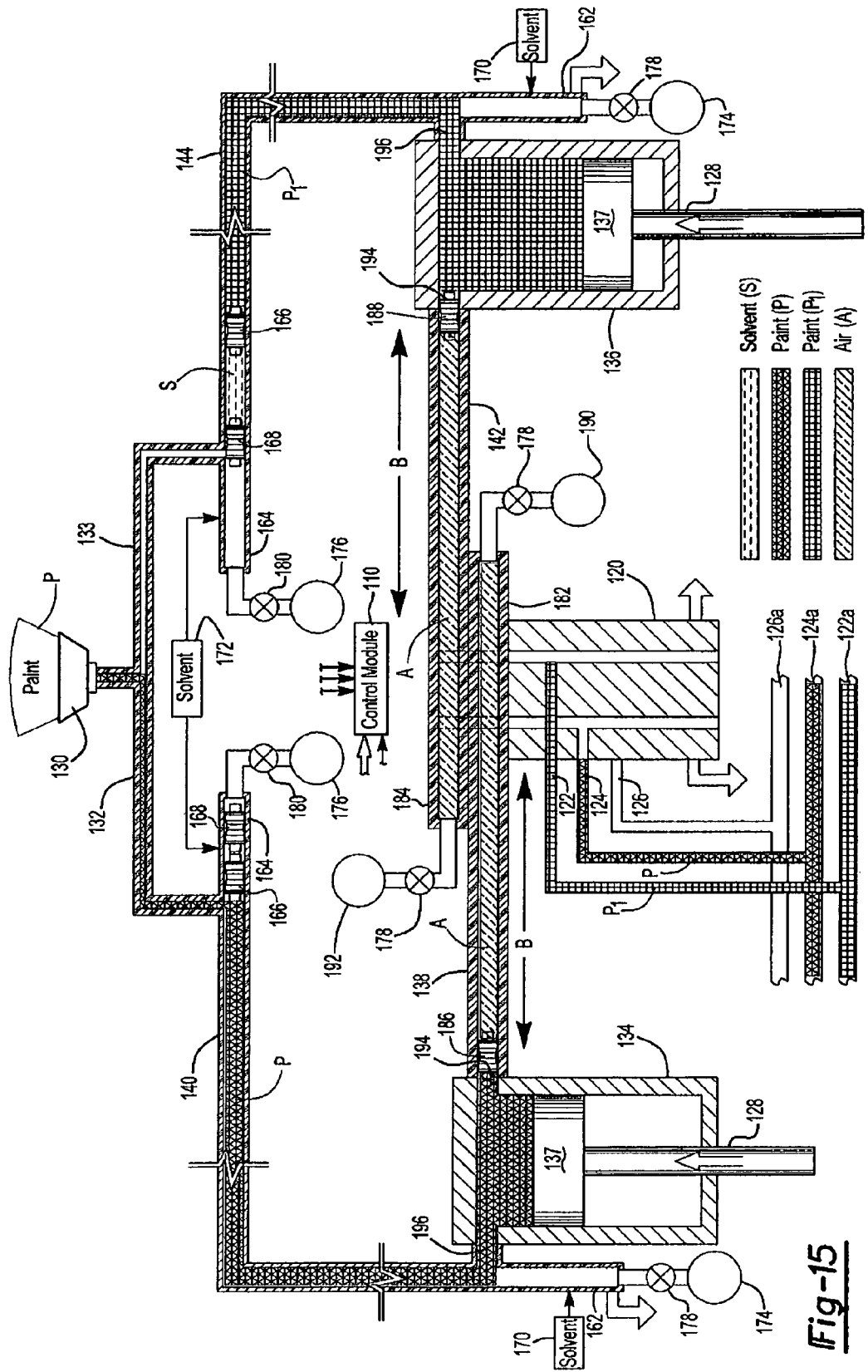

In a preferred embodiment of the method of delivering and applying a paint to a substrate of this invention, a second paint $P_1$ is simultaneously delivered from the color changer 120 to the second paint canister 136 as shown in FIG. 12. In the disclosed embodiment, the paint $P_1$ is delivered from line 122a to the paint supply switching device or color changer 120 through line 122 as shown in FIG. 12. As shown in FIG. 13, the piston 137 of the first paint canister continues to drive paint to the paint applicator 130 as the second paint $P_1$ is delivered to the second paint canister 136 and the piston 137 of the second paint canister 136 is retracted as shown in FIG. 13. The second pigging element 188 of the paint supply switching device or color changer 120 is then driven by a nonconductive fluid or pneumatic pressure by opening valve 178 of the source of nonconductive fluid 192, thereby electrically isolating the paint supply switching device or color changer 120 from the second paint canister 136 as shown in FIG. 14, thereby creating a voltage block B between the color changer 120 and the second paint canister 136 and delivering paint remaining in the third supply or delivery line 142 to the second paint canister 136 and delivering a predetermined volume or dose of paint $P_1$ to the second paint canister 136 as shown in FIG. 14. The piston 137 of the second paint canister 136 may then be reversed and driven toward the outlet 196 of the second paint canister 136 to begin delivery of the second paint $P_1$ to the applicator 130 even as the first paint P is delivered to the applicator and applied to a substrate (not shown) as shown in FIG. 15. Alternatively, delivery of the second paint may be held until after completion of the delivery of the first paint.

Figure 16:
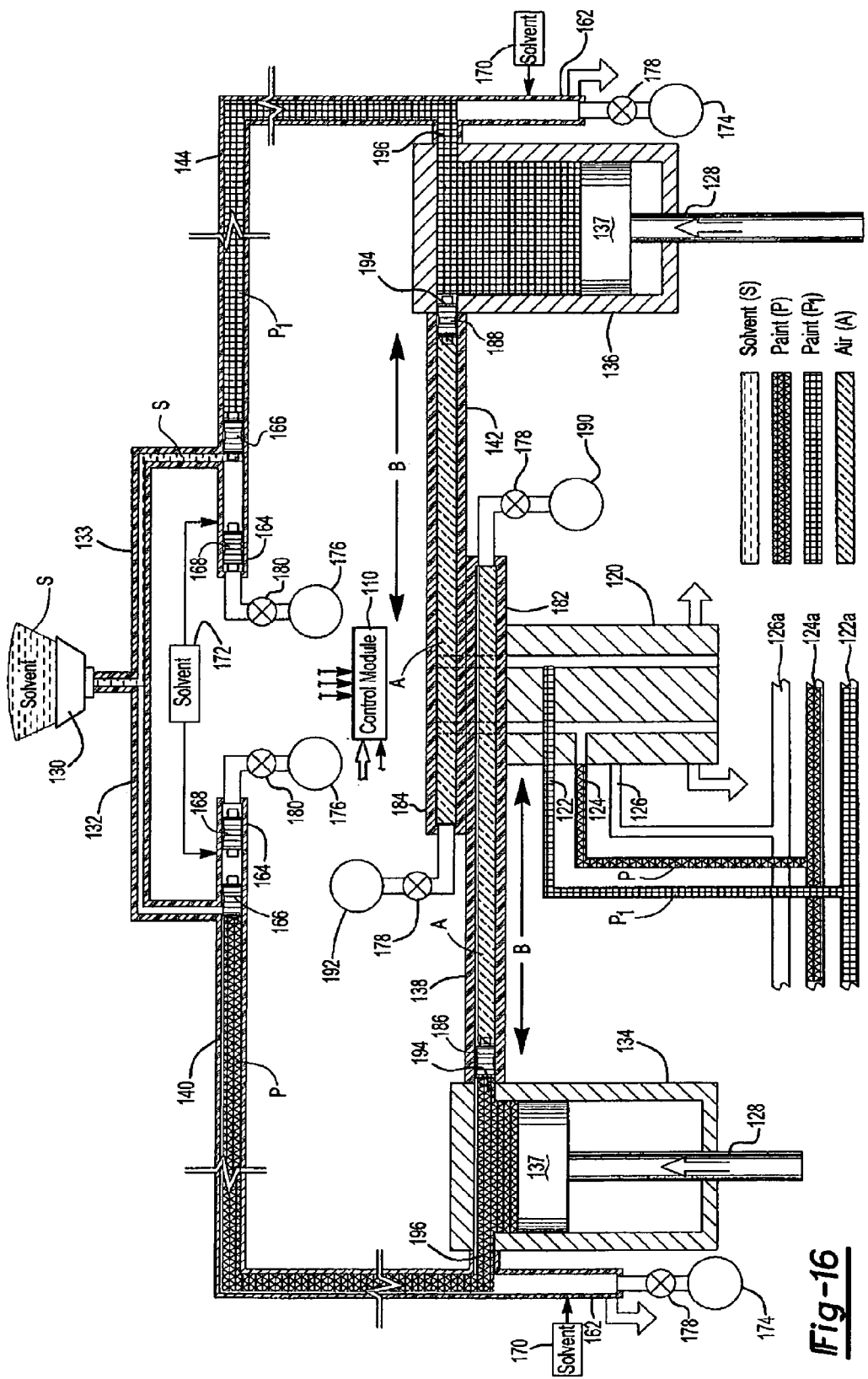
Figure 17:
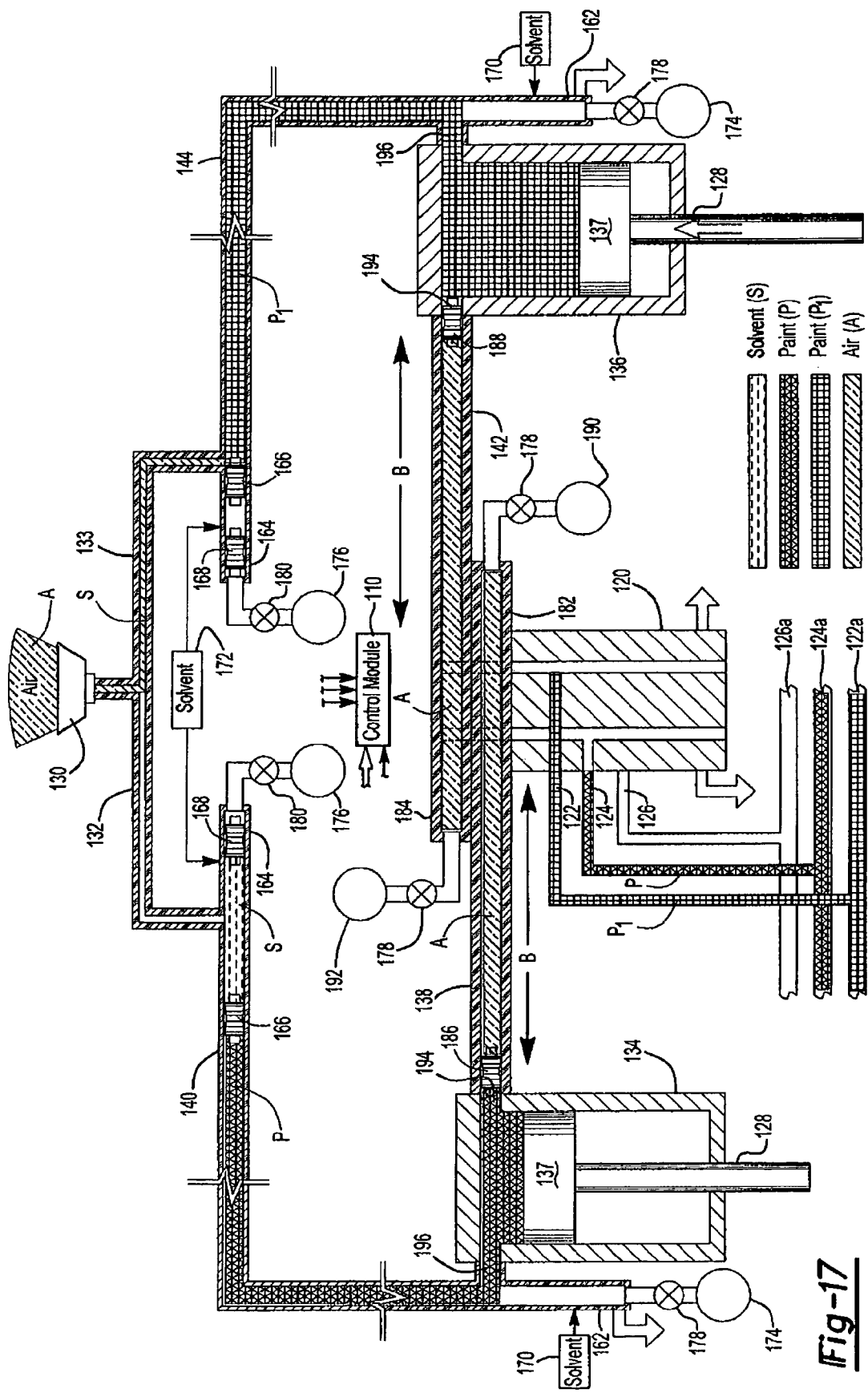
Figure 18:
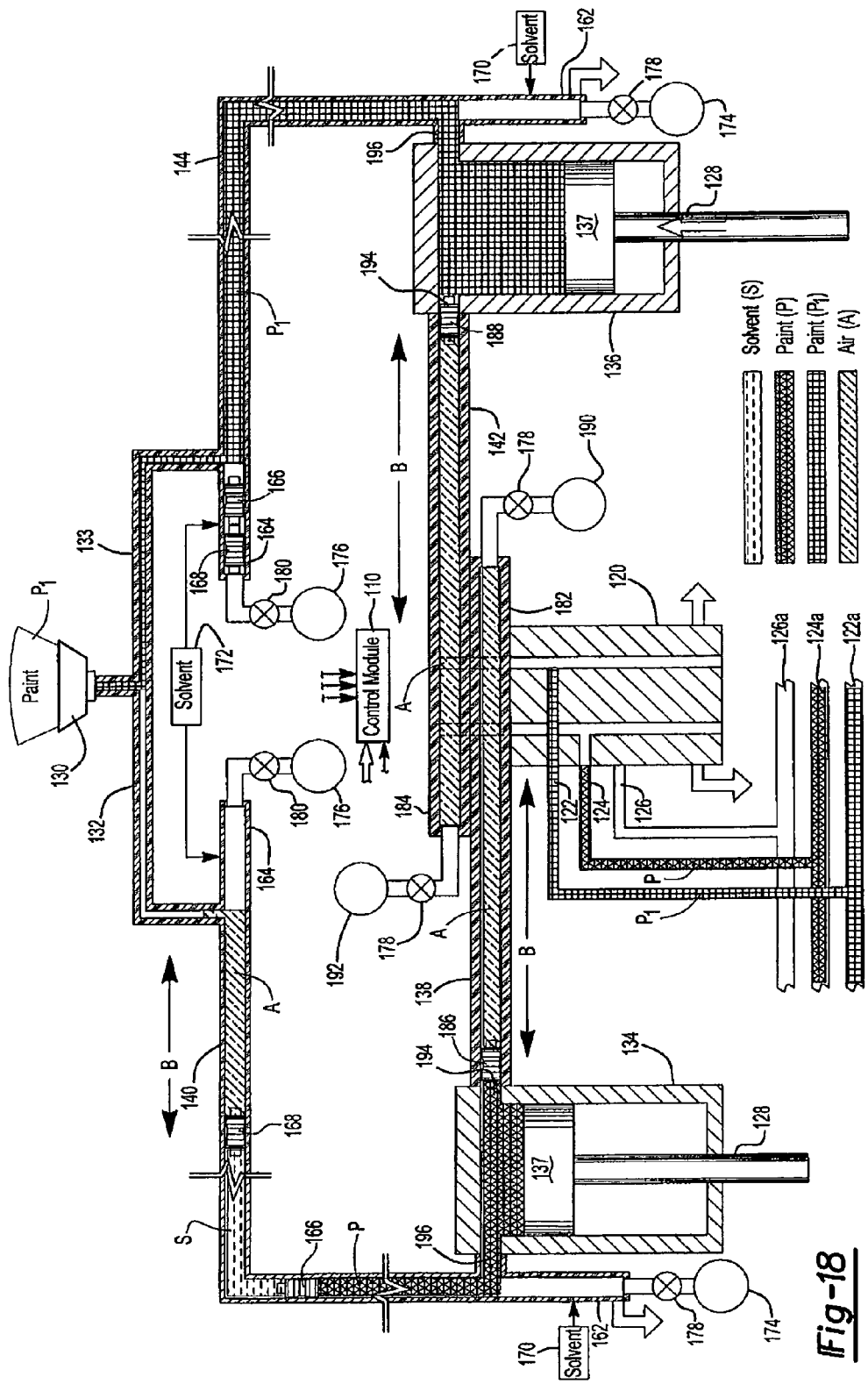
Figure 19:
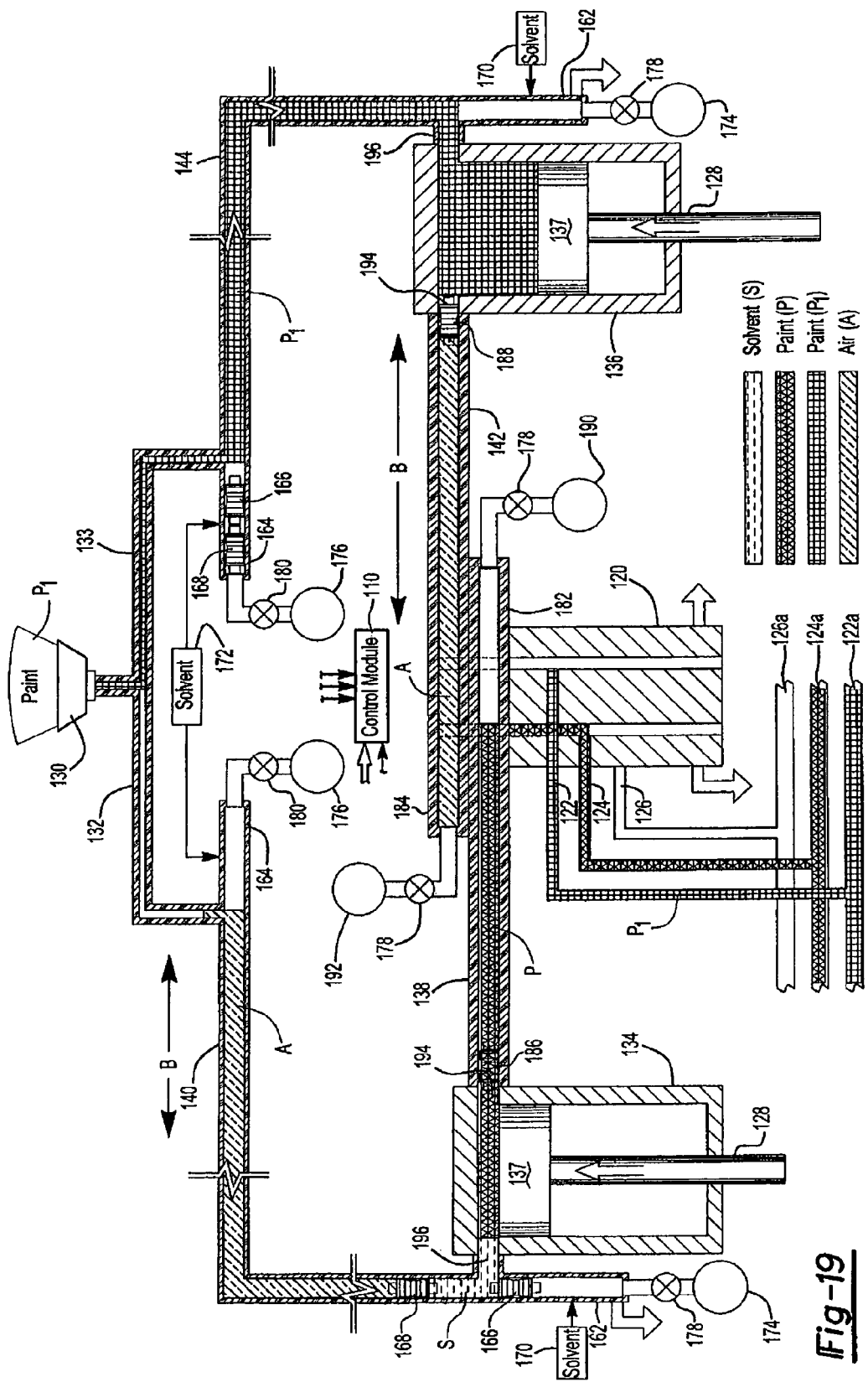
Figure 20:
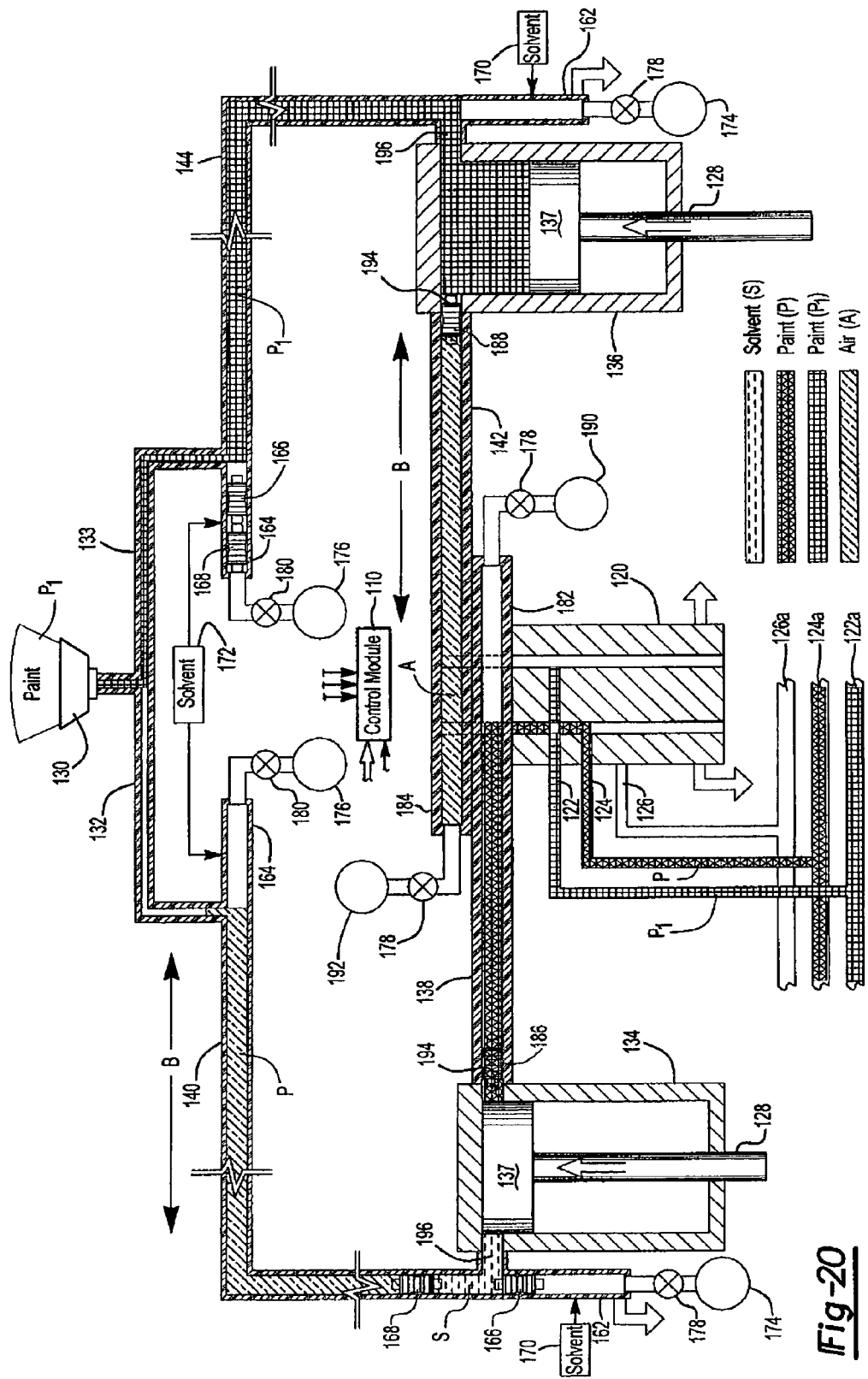
Figure 21:
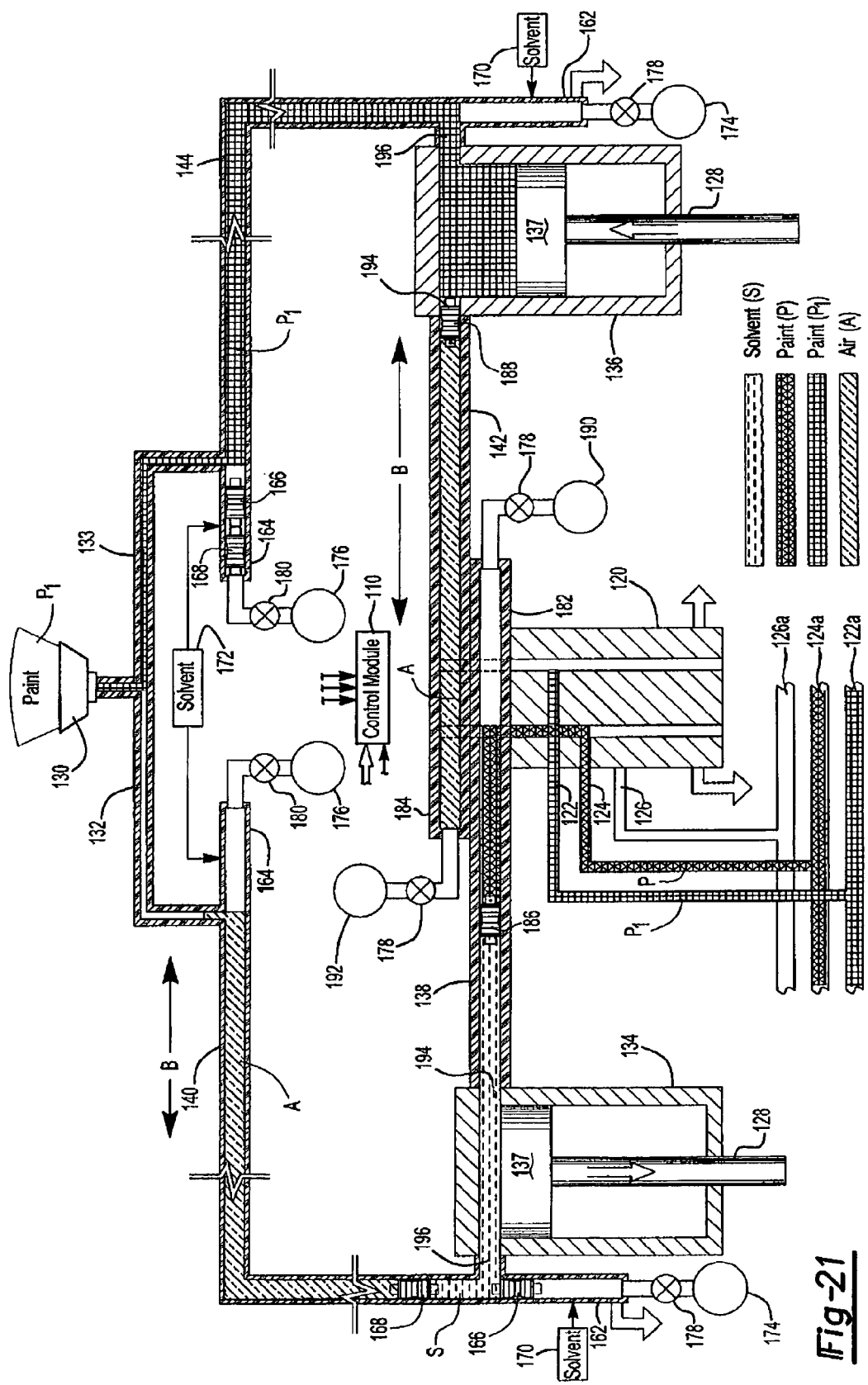
Figure 22:
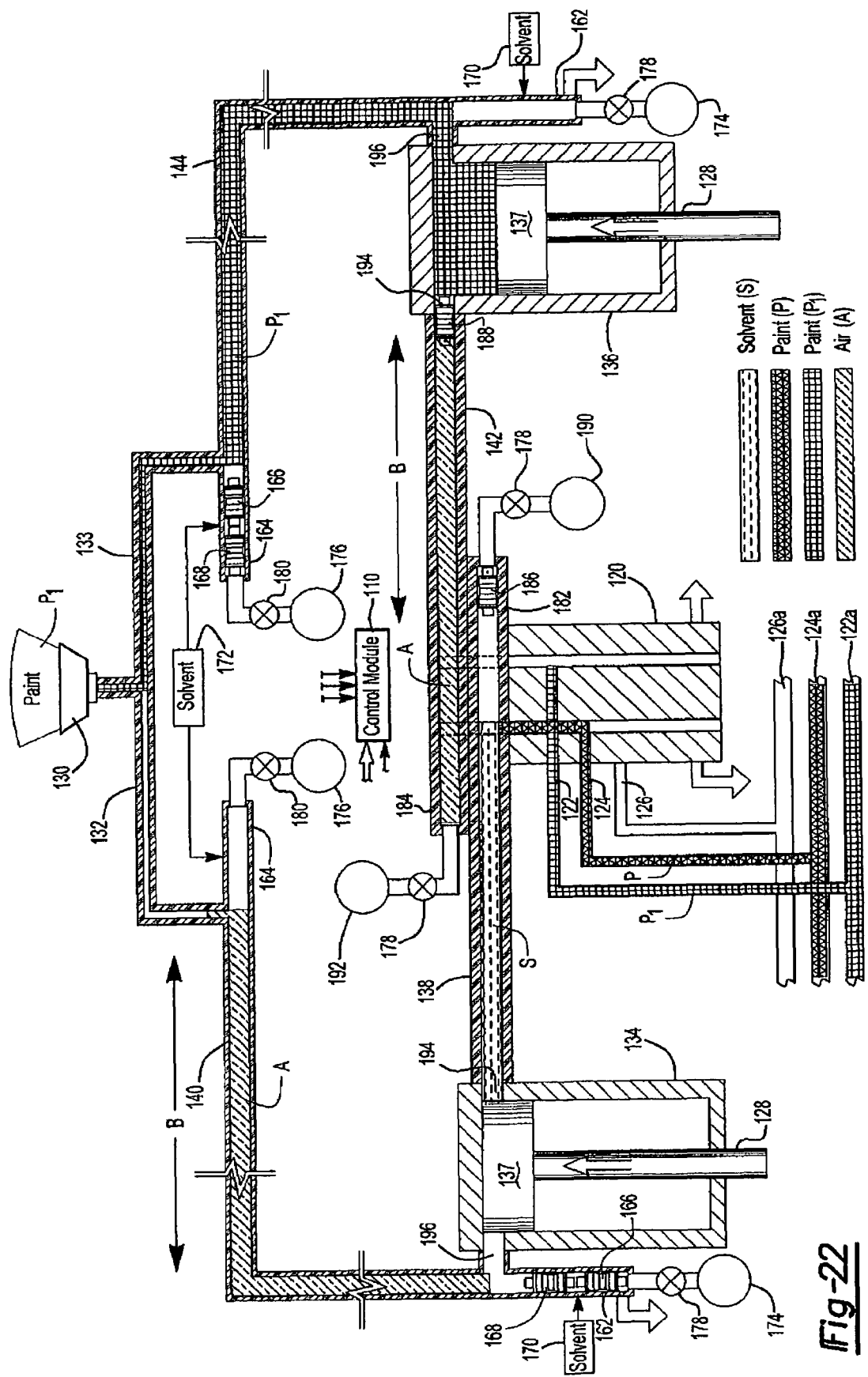
Figure 23:
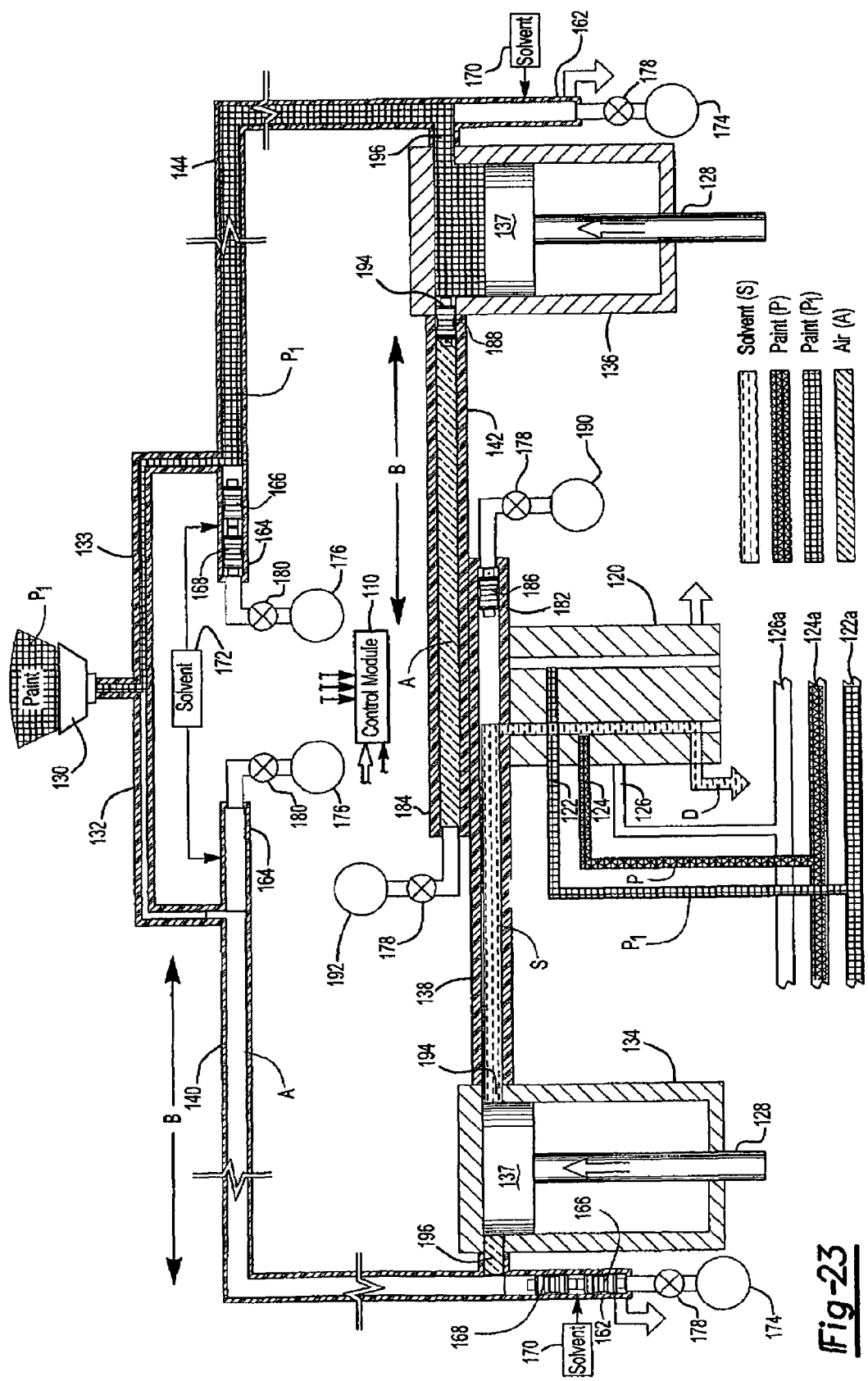
Figure 24:
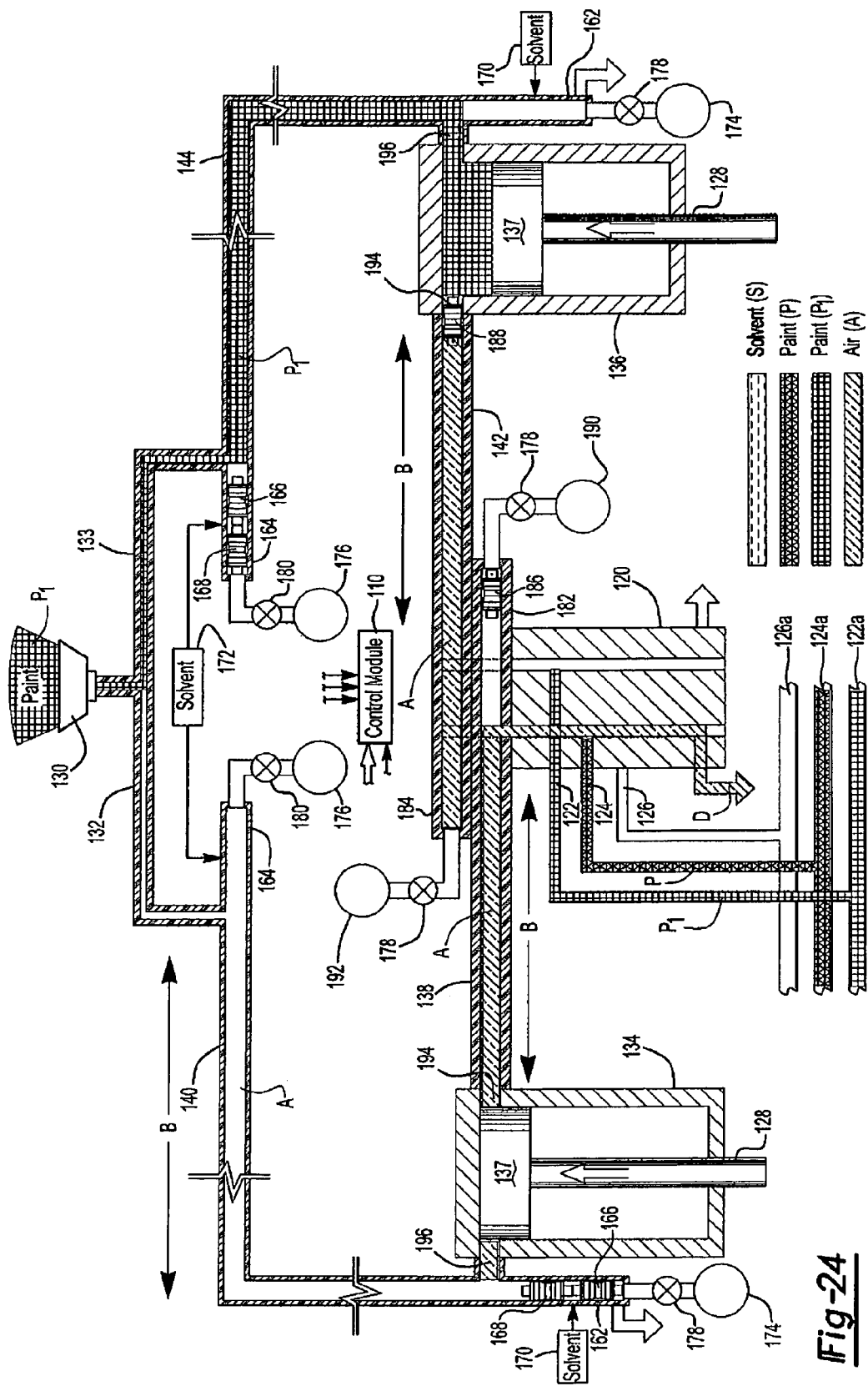

Upon completion of the delivery of the first paint P to the applicator 130, the first and second pigging elements 166 and 168 are delivered to the second pig station 164 by the piston 137 of the second paint canister 136, thereby delivering solvent S to the applicator 130, and purging the third delivery line 144 and the applicator 130 of the first paint as shown in FIG. 16. At this time, the paint supply switching device or color changer 120 is electrically isolated from both the first paint canister 134 and the second paint canister 136 creating a voltage block B as shown. Solvent is then delivered between the pigging elements 166 and 168 in the second pig station 164 by solvent supply 172 as shown in FIG. 17 and the first and second pigging elements 166 and 168 are then driven by nonconductive fluid or pneumatic pressure by opening valve 180 of supply 176 as shown in FIG. 18, thereby electrically isolating the paint applicator 130 from the first paint canister 134, creating a voltage block B as shown in FIG. 18. Substantially simultaneously, the second paint $P_1$ is driven by the piston 137 of the second paint canister 136 through the fourth delivery line 144 to the paint applicator 130 as shown in FIG. 18, wherein the paint supply switching device or color changer 120 is electrically isolated from the first and second paint canisters 134 and 136 and particularly the second paint canister 136. As the second paint $P_1$ is delivered by the piston 137 of the second paint canister 136, the first and second pigging elements 166 and 168 in the second delivery line with solvent therebetween are delivered to the first pig station 162, thereby delivering paint remaining in the second delivery line to the first paint canister as shown in FIG. 18 and the piston 137 of the first paint canister is simultaneously retracted to receive the first paint remaining in the second delivery line 140 as shown in FIG. 18. The piston 137 of the first paint canister is then reversed toward the inlet 194, thereby driving the first paint P through the first supply or delivery line 138 back to the color changer 120 and from the color changer back through lines 124 and 124a to the original source of the first paint P. The solvent between the first and second pigging elements 166 and 168 may then be utilized to purge the face of the piston 137 of the first paint canister 134 and the first delivery line 138 by retracting the piston 137 to receive solvent as shown in FIG. 21 and then extended as shown in FIG. 22 to deliver the solvent S to the paint supply switching device or color changer 120 and the spent solvent is then driven by pulsed pneumatic pressure to a solvent dump D of the color changer 120 as shown in FIG. 23. Simultaneously with the return of the first paint P to the paint supply switching device for color changer 120, the second paint $P_1$ is being delivered by the piston 137 of the second paint canister 136 to the paint applicator 130 as shown in FIGS. 21 to 24. Further, as the second paint "$P_1$" is being delivered to the paint applicator 130, the first paint or a third paint is delivered to the first paint canister 134 and the method or process of this invention is continued indefinitely.

As set forth above and further described in a copending application, the first and second paint canisters 134 and 136 may be located adjacent the paint supply switching device or color changer 120 outside a paint spray booth permitting repair or maintenance of the paint canisters without entering the paint spray booth and delivering solvent between the first and second pigs or pigging elements 166 and 168 in the first pig station 162 adjacent the paint canisters eliminates the requirement for a separate solvent wash as described above with regard to FIG. 1.

As set forth above in regard to the embodiment shown in FIGS. 1 to 3, the process described may then be repeated indefinitely, wherein one paint canister is being charged while the second is applying paint through the applicator 30. The second embodiment of the paint delivery and application system, however, has further advantages over the embodiment disclosed in FIGS. 1 to 3. First, a solvent wash is automatically provided with each application of paint eliminating dried paint from the hoses or lines, the applicator and the paint canisters or piston dosing devices. Second, hosing is reduced by locating the piston dosing devices outside of the paint booths adjacent the color changer. Further, the pressure requirement for the color changer is reduced and the location of the piston dosing devices or paint canisters outside the paint booth provides further advantages, including reduced maintenance. For example, if one paint application system fails, it is possible to provide maintenance without entering the paint booth. Finally, the second embodiment of the paint delivery and application system of this invention may be utilized with conventional paint application systems, including conventional paint robots, overhead and side mounted paint application systems, etc. without modifying the applicator by providing paint canisters on or adjacent the paint applicator, such as on the paint robot as disclosed in FIG. 3. The improved piston dosing device also provides further advantages including greater accuracy, durability and reduced waste. The utilization of the disclosed piston dosing devices also eliminates a metering device in the lines to the applicator.

Figure 25:
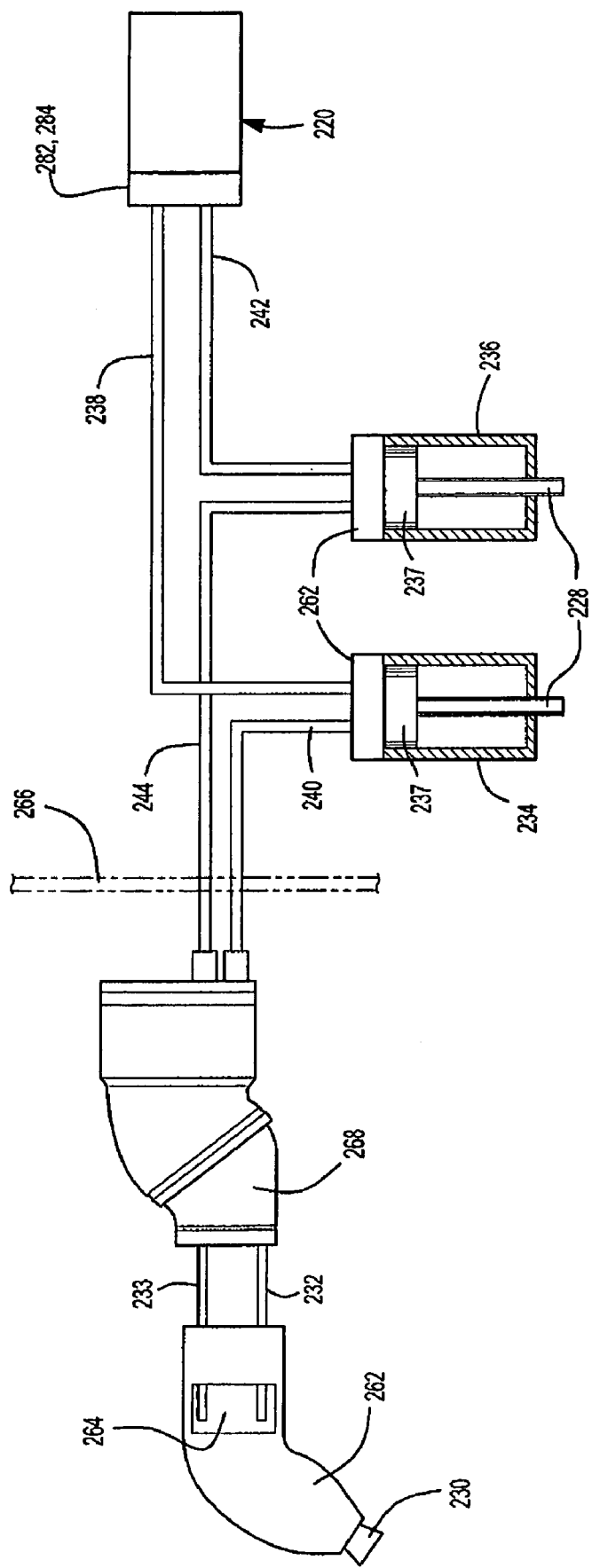
FIG. 25 is a partially schematic view of a paint delivery and application system of this invention wherein the pig stations are located in the paint canisters and rotary atomizer.

The embodiment of the paint delivery and application system shown in FIG. 25 is similar to the embodiment illustrated in FIG. 4 except that the pig stations are located in or mounted on the paint supply switching device or color changer 220, the paint canisters 234 and 236 and the paint applicator. As described above with respect to FIG. 4, the paint delivery and application system shown in FIG. 25 includes a color changer 220, first and second paint canisters 234 and 236 respectively, each having a piston 237 reciprocable in the paint canisters and a paint applicator 230. In the disclosed embodiment, the paint applicator is an electrostatic rotary bell atomizer including a rotary atomizer 262 which may be mounted on a "hand axis" or rotary joint 268 of a robot arm (not shown) or may be mounted on an overhead or side mounted application device. As described above with respect to FIG. 4, the paint delivery and application system includes a first delivery line 238 between the paint supply switching device or color changer 220 and the first paint canister 234, a second delivery or supply line 240 between the first paint canister 234 and the applicator, a third supply or delivery line 242 between the color changer 220 and the second paint canister 236 and a fourth delivery or supply line 244 between the second paint canister 236 and the applicator. The second delivery line 240 communicates with the rotary atomizer 262 through line 232 and the fourth delivery line 244 communicates with the rotary atomizer 262 through line 233. The pistons 237 of the first and second paint canisters 234 and 236, respectively, are supported on piston rods 228 which are connected to a servomotor or other servo drive (not shown) for accurate movement of the piston 237 in the paint canisters as described above with regard to FIG. 4. As will be noted from the above description, the reference numbers in FIG. 25 are identical to the reference numbers in FIG. 4 except that the reference numbers in FIG. 25 are in the 200 series rather than the 100 series.

As shown in FIG. 25, the first pig stations 262 are located in or on one end of the first and second paint canisters 234 and 236, respectively, and the second pig stations 264 are located in the rotary atomizer 262. Further, the paint canisters 234 and 236 are located outside the paint booth as indicated by phantom line 266. The sending pig stations 282 and 284 (182 and 184 in FIG. 4) are located in or on the paint supply switching device or color changer 220 as shown in FIG. 4. Except as described above, the paint delivery and application system shown in FIG. 25 may be the same as the paint delivery and application system shown in FIG. 4 and the method of delivering and applying paint to a substrate utilizing the paint delivery and application system of FIG. 25 may be identical to the method described in regard to FIGS. 5 to 24 above.

Having described preferred embodiments of the paint delivery and application system and method of this invention, it will be understood that various modifications may be made within the purview of the appended claims. For example, as set forth above, the paint delivery and application system of this invention may include three or more paint canisters or piston closing devices connected between the color changer and the paint applicator in parallel as described. As will be understood from the above description, the term paint canister is intended to be generic to a paint container with or without a piston including a piston closing device. Although the preferred embodiments of the paint delivery and application system of this invention includes the pigging technology described above, the method of applying a first paint to a substrate from a first paint canister while filling a second paint canister may also be utilized without the pigging technology described, particularly where the coating is nonconductive. The pigging technology described has particular advantages where the paint is electrically conductive and the paint is applied by an electrostatically charged rotary atomizer, wherein the paint supplied from a first paint canister to the paint applicator is electrically isolated from the color changer and a second paint canister being charged with paint is electrically isolated from the paint applicator by the pigging technology.

The invention claimed is:

1. A paint delivery and application system, comprising:
   a paint supply switching device including at least two sources of paint;
   at least two paint canisters;
   a paint applicator;
   a first pair of separate supply lines connecting said paint supply switching device and said paint canisters;
   a pigging element movable in each of said first pair of supply lines between a first station adjacent said paint supply switching device and a second station adjacent one of said paint canisters;
   a second pair of separate supply lines connecting said canisters to said paint applicator; and
   a pigging element in each of said second pair of separate supply lines movable between a first station adjacent one of said paint canisters and a second station adjacent or within said paint applicator;
   whereby a first paint may be delivered from a first of said paint canisters to said paint applicator while a second paint is delivered from said paint supply switching device to a second of said paint canisters; and
   wherein said second of said paint canisters is electrically isolated from said paint applicator when said second paint is delivered from said paint supply switching device to said second of said paint canisters and/or said paint supply switching device is electrically isolated from said first of said paint canisters when said first paint is delivered from said first paint canister to said paint applicator.

2. The system as defined in claim 1, wherein movement of said pigging element between said second station adjacent or within said paint applicator and said first station adjacent one of said paint canisters electrically isolates said paint canister from said paint applicator.

3. A paint delivery and application system, comprising:
   a paint supply switching device including at least two sources of paint;
   at least two paint canisters;
   a paint applicator;
   a first pair of separate supply lines connecting said paint supply switching device and said paint canisters;
   a pigging element movable in each of said first pair of supply lines between a first station adjacent said paint supply switching device and a second station adjacent one of said paint canisters;
   a second pair of separate supply lines connecting said canisters to said paint applicator; and
   a pigging element in each of said second pair of separate supply lines movable between a first station adjacent one of said paint canisters and a second station adjacent or within said paint applicator;
   whereby a first paint may be delivered from a first of said paint canisters to said paint applicator while a second paint is delivered from said paint supply switching device to a second of said paint canisters; and
   wherein said first stations are a trunk line communicating with one of said supply lines receiving said pigging element and permitting paint to flow past said pigging element until released in said supply line.

4. A paint delivery and application system, comprising:
   a paint supply switching device including at least two sources of paint;
   at least two paint canisters;
   a paint applicator;
   a first pair of separate supply lines connecting said paint supply switching device and said paint canisters;
   a pigging element movable in each of said first pair of supply lines between a first station adjacent said paint supply switching device and a second station adjacent one of said paint canisters;
   a second pair of separate supply lines connecting said canisters to said paint applicator; and
   a pigging element in each of said second pair of separate supply lines movable between a first station adjacent one of said paint canisters and a second station adjacent or within said paint applicator;
   whereby a first paint may be delivered from a first of said paint canisters to said paint applicator while a second paint is delivered from said paint supply switching device to a second of said paint canisters; and
   wherein said system includes a source of solvent under pressure and a solvent supply line connected directly from said source of solvent to said applicator for flushing said applicator.

5. A paint delivery and application system, comprising:
   a paint supply switching device including at least two sources of paint;
   at least two paint canisters;
   a paint applicator;
   a first pair of separate supply lines connecting said paint supply switching device and said paint canisters;
   a pigging element movable in each of said first pair of supply lines between a first station adjacent said paint supply switching device and a second station adjacent one of said paint canisters;
   a second pair of separate supply lines connecting said canisters to said paint applicator; and
   a pigging element in each of said second pair of separate supply lines movable between a first station adjacent one of said paint canisters and a second station adjacent or within said paint applicator;
   whereby a first paint may be delivered from a first of said paint canisters to said paint applicator while a second paint is delivered from said paint supply switching device to a second of said paint canisters; and
   wherein said second pair of separate supply lines each include at least two pigging elements having solvent therebetween, thereby flushing said second pair of separate supply lines and said applicator with solvent.

6. A paint delivery and application system, comprising:
   a paint supply switching device including at least two sources of paint;
   at least two paint canisters;
   a paint applicator;
   a first pair of separate supply lines connecting said paint supply switching device and said paint canisters;
   a pigging element movable in each of said first pair of supply lines between a first station adjacent said paint supply switching device and a second station adjacent one of said paint canisters;
   a second pair of separate supply lines connecting said canisters to said paint applicator; and a pigging element in each of said second pair of separate supply lines movable between a first station adjacent one of said paint canisters and a second station adjacent or within said paint applicator;

whereby a first paint may be delivered from a first of said paint canisters to said paint applicator while a second paint is delivered from said paint supply switching device to a second of said paint canisters; and wherein said paint applicator is located in a paint spray booth and said paint canisters and said paint supply switching device are located outside said paint spray booth.

7. A paint delivery and application system, comprising:

a paint supply switching device including at least two sources of paint;

at least two paint canisters;

a paint applicator;

a first pair of separate supply lines connecting said paint supply switching device and said paint canisters;

a pigging element movable in each of said first pair of supply lines between a first station adjacent said paint supply switching device and a second station adjacent one of said paint canisters;

a second pair of separate supply lines connecting said canisters to said paint applicator; and a pigging element in each of said second pair of separate supply lines movable between a first station adjacent one of said paint canisters and a second station adjacent or within said paint applicator;

whereby a first paint may be delivered from a first of said paint canisters to said paint applicator while a second paint is delivered from said paint supply switching device to a second of said paint canisters; and wherein said paint applicator is located in a paint spray booth, said paint applicator is a robotic paint applicator and said paint canisters are located on said robotic paint applicator.

8. A paint delivery and application system, comprising:

a paint supply switching device including at least two sources of paint;

at least two paint canisters;

a paint applicator;

a first pair of separate supply lines connecting said paint supply switching device and said paint canisters;

a pigging element movable in each of said first pair of supply lines between a first station adjacent said paint supply switching device and a second station adjacent one of said paint canisters;

a second pair of separate supply lines connecting said canisters to said paint applicator; and a pigging element in each of said second pair of separate supply lines movable between a first station adjacent one of said paint canisters and a second station adjacent or within said paint applicator;

whereby a first paint may be delivered from a first of said paint canisters to said paint applicator while a second paint is delivered from said paint supply switching device to a second of said paint canisters; and wherein said system includes a control module delivering said first paint from said paint supply switching device to said first of said paint canisters through a first supply line of said first pair of supply lines, then upon delivery of substantially all of a predetermined quantity of said first paint to said first of said paint canisters, said control module releasing one of said pigging elements into said first supply line under pneumatic pressure, thereby delivering a remainder of said first paint to said first of said paint canisters and electrically isolating said first of said paint canisters from said paint supply switching device.

9. A paint delivery and application system, comprising:

a paint supply switching device including at least two sources of paint;

at least two paint canisters;

a paint applicator;

a first pair of separate supply lines connecting said paint supply switching device and said paint canisters;

a pigging element movable in each of said first pair of supply lines between a first station adjacent said paint supply switching device and a second station adjacent one of said paint canisters;

a second pair of separate supply lines connecting said canisters to said paint applicator; and a pigging element in each of said second pair of separate supply lines movable between a first station adjacent one of said paint canisters and a second station adjacent or within said paint applicator;

whereby a first paint may be delivered from a first of said paint canisters to said paint applicator while a second paint is delivered from said paint supply switching device to a second of said paint canisters; and wherein said paint canisters each include a reciprocal piston which retracts upon filling said paint canister and paint in said paint canister is then driven to said paint applicator by extending said piston.

10. The system as defined in claim 9, wherein said piston is driven by dosing means comprising an electric motor and/or a servo drive.

11. The system as defined in claim 8, wherein said control module then delivers said first paint under pressure from said first of said paint canisters to said paint applicator and simultaneously delivers said second paint from said paint supply switching device to said second of said paint canisters while said second of said paint canisters is electrically isolated from said paint applicator.

12. A paint delivery and application system, comprising:

a paint supply switching device including at least two sources of paint and a source of paint under pressure;

at least two paint canisters, including a first paint canister having a piston reciprocable therein;

a paint applicator;

a first pair of separate supply lines connecting said paint supply switching device and said paint canisters, including a first delivery line between said source of paint under pressure and said first paint canister adapted to deliver paint from said source of paint under pressure to said first paint canister;

a second pair of separate supply lines connecting said canisters to said paint applicator, including a second delivery line between said first paint canister and said paint applicator adapted to deliver paint from said first paint canister to said paint applicator;

a first pig station communicating with said second delivery line adjacent said first paint canister;

a second pig station communicating with said second delivery line adjacent or within said paint applicator;

a pigging element movable in each of said first pair of supply lines between a first station adjacent said paint supply switching device and a second station adjacent one of said paint canisters;

a pigging element in each of said second pair of separate supply lines movable between a first station adjacent one of said paint canisters and a second station adjacent or within said paint applicator, including at least one pigging element movable in said second delivery line between said first pig station adjacent said first paint canister and said second pig station adjacent or within said paint applicator; and a source of solvent under pressure communicating with said second delivery line adjacent or within said paint applicator;

whereby, a first paint may be delivered from said first paint canister to said paint applicator while a second paint is delivered from said paint supply switching device to a second of said paint canisters; and whereby, paint is delivered from said source of paint under pressure to said first paint canister upon retraction of said piston in said first paint canister, paint is delivered to said paint applicator upon extension of said piston in said first paint canister and a predetermined volume of solvent is delivered to said second supply line from said source of solvent under pressure upon retraction of said piston in said paint canister following delivery of paint to said paint applicator.

13. The system as defined in claim 12, wherein said second delivery line includes two pigging elements and said source of solvent under pressure is connected to said second pig station to deliver solvent between said pigging elements.

14. A method of delivering and applying paint to a substrate using a paint delivery and application system including a paint supply switching device having at least two sources of paint under pressure, at least two paint canisters, a paint applicator, a first pair of separate supply lines connecting said paint delivery and switching device and said paint canisters, and a second pair of separate supply lines connecting said paint canisters to said paint applicator, said method comprising the following steps:

directing a first paint under pressure from said paint supply switching device to a first of said paint canisters;

directing said first paint from said first of said canisters to said paint applicator, thereby delivering said first paint to said substrate;

delivering a second paint under pressure from said paint supply switching device to a second of said paint canisters;

moving at least one pigging element through each of said supply lines respectively between a first station adjacent said switching device and a second station adjacent one of said canisters and between a first station adjacent one of said canisters and a second station adjacent or within said paint applicator; and electrically isolating said second of said paint canisters from said paint applicator when said second paint is delivered from said paint supply switching device to said second of said paint canisters.

15. A method of delivering and applying paint to a substrate using a paint delivery and application system including a paint supply switching device having at least two sources of paint under pressure, at least two paint canisters, a paint applicator, a first pair of separate supply lines connecting said paint delivery and switching device and said paint canisters, and a second pair of separate supply lines connecting said paint canisters to said paint applicator, said method comprising the following steps:

directing a first paint under pressure from said paint supply switching device to a first of said paint canisters;

directing said first paint from said first of said canisters to said paint applicator, thereby delivering said first paint to said substrate;

delivering a second paint under pressure from said paint supply switching device to a second of said paint canisters;

moving at least one pigging element through each of said supply lines respectively between a first station adjacent said switching device and a second station adjacent one of said canisters and between a first station adjacent one of said canisters and a second station adjacent or within said paint applicator; and electrically isolating said first of said paint canisters from said paint supply switching device as said first paint is directed from said first of said paint canisters to said paint applicator.

16. A method of delivering and applying paint to a substrate using a paint delivery and application system including a paint supply switching device having at least two sources of paint under pressure, at least two paint canisters, a paint applicator, a first pair of separate supply lines connecting said paint delivery and switching device and said paint canisters, and a second pair of separate supply lines connecting said paint canisters to said paint applicator, said method comprising the following steps:

directing a first paint under pressure from said paint supply switching device to a first of said paint canisters;

directing said first paint from said first of said canisters to said paint applicator, thereby delivering said first paint to said substrate;

delivering a second paint under pressure from said paint supply switching device to a second of said paint canisters;

moving at least one pigging element through each of said supply lines respectively between a first station adjacent said switching device and a second station adjacent one of said canisters and between a first station adjacent one of said canisters and a second station adjacent or within said paint applicator; and delivering solvent under pressure directly to said paint applicator from a source of solvent under pressure following delivery of said first paint to said paint applicator.

17. A method of delivering and applying paint to a substrate using a paint delivery and application system including a paint supply switching device having at least two sources of paint under pressure, at least two paint canisters each containing a reciprocable piston, a paint applicator, a first pair of separate supply lines connecting said paint delivery and switching device and said paint canisters, and a second pair of separate supply lines connecting said paint canisters to said paint applicator, said method comprising the following steps:

directing a first paint under pressure from said paint supply switching device to a first of said paint canisters;

directing said first paint from said first of said canisters to said paint applicator, thereby delivering said first paint to said substrate;

delivering a second paint under pressure from said paint supply switching device to a second of said paint canisters;

moving at least one pigging element through each of said supply lines respectively between a first station adjacent said switching device and a second station adjacent one of said canisters and between a first station adjacent one of said canisters and a second station adjacent or within said paint applicator; and directing said first paint under pressure to said first of said paint canisters, and retracting its said piston, thereby at least partially filling said first of said paint canisters, then extending its said piston to drive said first paint to said paint applicator, and delivering said second paint to said second of said paint canisters, thereby at least partially filling said second of said paint canisters and retracting its said piston, then extending its said piston to drive said second paint to said paint applicator.

18. A method of delivering and applying paint to a substrate using a paint delivery and application system including a paint supply switching device having at least two sources of paint under pressure, at least two paint canisters, a paint applicator, a first pair of separate supply lines connecting said paint delivery and switching device and said paint canisters, and a second pair of separate supply lines connecting said paint canisters to said paint applicator, said method comprising the following steps:

directing a first paint under pressure from said paint supply switching device to a first of said paint canisters;

directing said first paint from said first of said canisters to said paint applicator, thereby delivering said first paint to said substrate;

delivering a second paint under pressure from said paint supply switching device to a second of said paint canisters; and moving at least one pigging element through each of said supply lines respectively between a first station adjacent said switching device and a second station adjacent one of said canisters and between a first station adjacent one of said canisters and a second station adjacent or within said paint applicator;

wherein said second pair of separate supply lines each include at least two pigging elements, said method including delivering solvent between said pigging elements and driving said paint and said pigging elements to said paint applicator, thereby flushing said second pair of separate supply lines and said applicator with solvent.

19. The method as defined in claim 18, wherein said second pair of separate supply lines each include a pigging element, a first pigging station adjacent said paint canister and a second pigging station adjacent or within said paint applicator, said method including driving said pigging element from said second pigging station to said first pigging station, thereby driving remaining paint in said second pair of supply lines to one of said paint canisters and retracting said piston, then extending said piston to drive said remaining paint to said paint supply switching device.

20. The method as defined in claim 17, wherein said second pair of separate supply lines each include a pigging element, a first pigging station adjacent said paint canister and a second pigging station adjacent or within said paint applicator, said method including driving said pigging element from said second pigging station to said first pigging station, thereby driving remaining paint in said second pair of supply lines to one of said paint canisters and retracting said piston, then extending said piston to drive said remaining paint to said paint supply switching device.

21. A method of delivering and applying paint to a substrate using a paint delivery and application system including a paint supply switching device having at least two sources of paint under pressure, at least two paint canisters, a paint applicator, a first pair of separate supply lines connecting said paint delivery and switching device and said paint canisters, and a second pair of separate supply lines connecting said paint canisters to said paint applicator, said method comprising the following steps:

directing a first paint under pressure from said paint supply switching device to a first of said paint canisters;

directing said first paint from said first of said canisters to said paint applicator, thereby delivering said first paint to said substrate;

delivering a second paint under pressure from said paint supply switching device to a second of said paint canisters;

moving at least one pigging element through each of said supply lines respectively between a first station adjacent said switching device and a second station adjacent one of said canisters and between a first station adjacent one of said canisters and a second station adjacent or within said paint applicator;

delivering a predetermined quantity of a first paint from said paint supply switching device to said first of said paint canisters through a first supply line;

releasing a first pigging element under pneumatic pressure into said first supply line, thereby delivering a remaining predetermined quantity of said first paint to said first of said paint canisters and electrically isolating said first of said paint canisters from said paint supply switching device;

delivering a predetermined quantity of said first paint under pressure from said first of said paint canisters to said paint applicator;

releasing a second pigging element into a second supply line under pressure, thereby delivering a remaining predetermined quantity of said first paint in said first of said paint canisters to said paint applicator and applying said first paint to a substrate; and delivering a second paint from said paint supply switching device to said second of said paint canisters through a third supply line while said second of said paint canisters is electrically isolated from said paint applicator.

22. The method as defined in claim 21, wherein said method further includes releasing a third pigging element into said third supply line under pneumatic pressure, thereby delivering a predetermined quantity of said second paint to said second of said paint canisters and electrically isolating said second of said paint canisters from said paint supply switching device.

23. The method as defined in claim 21, wherein said method further includes in sequence driving said second paint from said second of said paint canisters to said paint applicator through a fourth supply line while said second of said paint canisters is electrically isolated from said paint supply and switching device and releasing a fourth pigging element into said fourth supply line thereby delivering a remaining quantity of said second paint from said second of said paint canisters to said paint applicator and applying said second paint to a substrate.

24. A method of delivering and applying paint to a substrate using a paint delivery and application system including a paint supply switching device having at least two sources of paint under pressure, at least two paint canisters, a paint applicator, a first pair of separate supply lines connecting said paint delivery and switching device and said paint canisters, and a second pair of separate supply lines connecting said paint canisters to said paint applicator, said method comprising the following steps:

directing a first paint under pressure from said paint supply switching device to a first of said paint canisters;

directing said first paint from said first of said canisters to said paint applicator, thereby delivering said first paint to said substrate;

delivering a second paint under pressure from said paint supply switching device to a second of said paint canisters; and moving at least one pigging element through each of said supply lines respectively between a first station adjacent said switching device and a second station adjacent one of said canisters and between a first station adjacent one of said canisters and a second station adjacent or within said paint applicator;

wherein said paint supply and switching device includes a source of solvent under pressure and said method further includes delivering solvent under pressure to said paint applicator through said first and second supply lines following delivery of said first paint through said paint applicator to a substrate.

25. A method of delivering a predetermined volume of solvent to a paint delivery and application system having at least one paint canister receiving paint from a source of paint under pressure including a piston reciprocating therein, a paint applicator, a delivery line between said paint canister and said paint applicator and a source of solvent under pressure connected to said delivery line adjacent or within said paint applicator, said method comprising the following steps:

delivering a predetermined volume of paint from said source of paint under pressure to said paint canister while withdrawing said piston;

extending said piston and driving paint from said paint canister to said paint applicator through said delivery line and creating a continuous stream of paint between said paint canister and said paint applicator; and delivering solvent under pressure to said delivery line adjacent or within said paint applicator while withdrawing said piston in said paint canister, thereby delivering said paint and said predetermined volume of solvent to said delivery line, wherein the volume of solvent delivered to said delivery line is determined by the distance said piston is withdrawn in said paint canister.

26. The method as defined in claim 25, wherein said method includes continuing to withdraw said piston in said paint canister to deliver said predetermined volume of solvent at least partly to said paint canister.

27. The method defined in claim 25, wherein said paint delivery and application system includes a pigging element in said delivery line, said method including extending said piston to deliver said paint and said pigging element to said paint applicator then delivering solvent to said delivery line adjacent or within said paint applicator and withdrawing said piston to deliver paint remaining in said delivery line to said paint canister, said solvent driving said pigging element to said paint canister.

* * * * *